US012486952B2

(12) United States Patent
Otto

(10) Patent No.: US 12,486,952 B2
(45) Date of Patent: Dec. 2, 2025

(54) SYSTEMS AND METHODS FOR OPTIMIZATION OF A PETROLEUM DISTRIBUTION SYSTEM

(71) Applicant: Sensia LLC, Houston, TX (US)

(72) Inventor: Ross Allen Otto, Cochrane (CA)

(73) Assignee: Sensia LLC, Houston, TX (US)

( * ) Notice: Subject to any disclaimer, the term of this patent is extended or adjusted under 35 U.S.C. 154(b) by 336 days.

(21) Appl. No.: 17/511,358

(22) Filed: Oct. 26, 2021

(65) Prior Publication Data

US 2022/0154888 A1 May 19, 2022

Related U.S. Application Data

(60) Provisional application No. 63/114,407, filed on Nov. 16, 2020.

(51) Int. Cl.
| | |
|---|---|
| G06Q 50/06 | (2024.01) |
| F17D 1/04 | (2006.01) |
| F17D 1/16 | (2006.01) |
| F17D 1/20 | (2006.01) |
| F17D 3/01 | (2006.01) |
| F17D 3/12 | (2006.01) |

(Continued)

(52) U.S. Cl.
CPC .......... *F17D 3/01* (2013.01); *F17D 1/04* (2013.01); *F17D 1/16* (2013.01); *F17D 1/20* (2013.01); *F17D 3/12* (2013.01); *G01F 1/662* (2013.01); *G01F 1/74* (2013.01); *G06F 30/28* (2020.01); *G06F 2113/08* (2020.01); *G06Q 50/06* (2013.01)

(58) Field of Classification Search
None
See application file for complete search history.

(56) References Cited

U.S. PATENT DOCUMENTS 5,937,894 A 8/1999 Rojey
6,112,137 A * 8/2000 McCarty ............ G05D 16/2093
700/47

(Continued)

FOREIGN PATENT DOCUMENTS

| CN | 106369278 A | 2/2017 |
| CN | 111442188 A | 7/2020 |

(Continued)

OTHER PUBLICATIONS

Strelnikova et al., "Adaptation of fluid motion mathematical model in pipelines using drag reducing agents", 2019, Pipeline simulation interest group, PSIG1906, pp. 1-22 (Year: 2019).*

(Continued)

*Primary Examiner* — Jason Lin
(74) *Attorney, Agent, or Firm* — Foley & Lardner LLP

(57) ABSTRACT

A method for optimizing a pipeline includes determining a mode of optimization and operation for the pipeline. The method also includes obtaining an objective function quantifying a performance variable as a function of one or more control decisions of the pipeline over a future time horizon. The method includes optimizing the objective function subject to one or more constraints to determine control decisions for the pipeline that result in an optimal value of the performance variable. The method includes operating equipment of the pipeline according to the control decisions.

16 Claims, 16 Drawing Sheets

(51) Int. Cl.
  *G01F 1/66* (2022.01)
  *G01F 1/74* (2006.01)
  *G06F 30/28* (2020.01)
  *G06F 113/08* (2020.01)

(56) References Cited

U.S. PATENT DOCUMENTS

| | | | |
|---|---|---|---|
| 6,236,894 B1* | 5/2001 | Stoisits | G05B 13/027 |
| | | | 700/32 |
| 6,397,946 B1 | 6/2002 | Vail | |
| 6,701,223 B1* | 3/2004 | Rachford, Jr. | G05B 13/021 |
| | | | 700/304 |
| 7,330,767 B2* | 2/2008 | Thiele | G05B 13/042 |
| | | | 703/2 |
| 7,561,928 B2* | 7/2009 | Peureux | G06Q 50/00 |
| | | | 700/282 |
| 7,720,575 B2* | 5/2010 | Ferber | G05D 7/0647 |
| | | | 700/282 |
| 9,027,585 B2 | 5/2015 | Smirnov | |
| 9,304,024 B2 | 4/2016 | Brown et al. | |
| 9,529,348 B2* | 12/2016 | Kephart | G05B 19/41885 |
| 9,915,399 B1* | 3/2018 | Latshaw | G06Q 10/0832 |
| 10,288,462 B2 | 5/2019 | Brown et al. | |
| 10,393,568 B2 | 8/2019 | Brown | |
| 10,704,005 B2 | 7/2020 | Aljindan | |
| 10,801,876 B1 | 10/2020 | Lansing et al. | |
| 11,326,591 B2* | 5/2022 | Dissing | F04B 49/02 |
| 11,340,604 B2* | 5/2022 | Rossi | G01M 3/2815 |
| 2008/0082215 A1* | 4/2008 | McDowell | F17D 3/01 |
| | | | 700/282 |
| 2009/0097354 A1 | 4/2009 | Straub, Jr. | |
| 2009/0164050 A1 | 6/2009 | Ahmad et al. | |
| 2012/0186655 A1 | 7/2012 | Smirnov et al. | |
| 2013/0037112 A1 | 2/2013 | Smirnov | |
| 2013/0146148 A1 | 6/2013 | Smirnov | |
| 2013/0175030 A1 | 7/2013 | Ige et al. | |
| 2013/0319531 A1 | 12/2013 | Hyde et al. | |
| 2014/0137642 A1 | 5/2014 | Henry et al. | |
| 2015/0198470 A1 | 7/2015 | Brown et al. | |
| 2016/0230513 A1 | 8/2016 | Dykstra et al. | |
| 2017/0067322 A1 | 3/2017 | Wong | |
| 2017/0184439 A1 | 6/2017 | Brown | |
| 2017/0299123 A1* | 10/2017 | Fowler | F04D 15/0066 |
| 2019/0234782 A1 | 8/2019 | Brown et al. | |
| 2020/0096452 A1 | 3/2020 | Song et al. | |
| 2020/0293706 A1 | 9/2020 | Vergil et al. | |
| 2021/0017847 A1 | 1/2021 | Aragall et al. | |
| 2022/0155117 A1 | 5/2022 | Brown et al. | |

FOREIGN PATENT DOCUMENTS

| | | | |
|---|---|---|---|
| CN | 111650354 A | 9/2020 | |
| FR | 2852666 A1 * | 9/2004 | ............... F17D 1/17 |
| JP | 2017-502319 A | 1/2017 | |
| WO | WO-02/50398 A1 | 6/2002 | |
| WO | WO-03/071091 A1 | 8/2003 | |
| WO | WO-2019/122718 A1 | 6/2019 | |

OTHER PUBLICATIONS

International Search Report and Written Opinion on PCT Appl. Ser. No. PCT/US2021/059396 dated Feb. 10, 2022 (17 pages).

International Search Report and Written Opinion on PCT Appl. Ser. No. PCT/US2021/059381 dated Mar. 25, 2022 (18 pages).

Department of Trade and Industry, Licensing and Consents Unit, Guidance Notes for Petroleum Measurement Under the Petroleum (Production) Regulations, Dec. 2003, Issue 7 (12 pages).

Kneisley et al., "Ultrasonic Meter Condition Based Monitoring—A fully Automated Solution," Proceedings of the North Sea Flow Measurement Workshop, Norway, Oct. 2009 (22 pages).

Peterson et al., "On Line Condition Based Monitoring of GAs USM's," 26th International North Sea Flow Measurement Workshop, Oct. 21-24, 2008 (26 pages).

Foreign Search Report on EP Patent Application No. 21892978.4 dated Oct. 25, 2024.

Brouwer et al., "Uncertainty Analysis of Finite Length Measurement Signals," 2013, pp. 1-16.

Foreign Search Report (European) on Appl. No. 21892983.4 dated Sep. 9, 2024 (9 Pages).

Recommended Procedures And Guidelines: "Determination of a Type A Uncertainty Estimate of a Mean Value from a Single Time Series Measurement," 2021, ITTC Recommended Procedures and Guidelines, pp. 1-47.

Brown et al., "An 8-Path Ultrasonic Master Meter for Oil Custody Transfers," 2006, XVIII IMEKO World Congress, Metrology for a Sustainable Development.

Final Office Action on JP Appl. No. 2023-528995 dated Feb. 25, 2025.

* cited by examiner

SYSTEMS AND METHODS FOR OPTIMIZATION OF A PETROLEUM DISTRIBUTION SYSTEM

CROSS-REFERENCE TO RELATED PATENT APPLICATION

This application claims the benefit of and priority to U.S. Provisional Application No. 63/114,407, filed Nov. 16, 2020, the entire disclosure of which is incorporated by reference herein.

BACKGROUND

The present disclosure relates to control systems or schema for a petroleum system. More particularly, the present disclosure relates to closed loop control systems or schema for a petroleum gas system including but not limited to a natural gas system, a crude oil system, a gasoline system, and other mixtures of oil and gas products.

SUMMARY

One implementation of the present disclosure is a method for optimizing a pipeline, according to some embodiments. In some embodiments, the method includes determining a mode of optimization and operation for the pipeline. In some embodiments, the method also includes obtaining an objective function quantifying a performance variable as a function of one or more control decisions of the pipeline over a future time horizon. In some embodiments, the method includes optimizing the objective function subject to one or more constraints to determine control decisions for the pipeline that result in an optimal value of the performance variable. In some embodiments, the method includes operating equipment of the pipeline according to the control decisions.

In some embodiments, the mode of optimization includes at least one of an emissions or energy consumption mode, a monetary cost mode, or a throughput mode. In some embodiments, in the emissions or energy consumption mode, the performance variable of the objective function is energy consumption and optimizing the objective function includes minimizing the objective function to determine control decisions that result in a minimum value of the performance variable over the future time horizon. In some embodiments, in the monetary cost mode, the performance variable of the objective function is monetary cost and optimizing the objective function includes minimizing the objective function to determine control decisions that result in a minimum value of the monetary cost over the future time horizon. In some embodiments, in the throughput mode, the performance variable of the objective function is a delivered amount of product and optimizing the objective function includes maximizing the objective function to determine control decisions that result in a maximum value of delivered amount of product over the future time horizon.

In some embodiments, the method is performed for an entirety of the pipeline to determine control decisions for the entirety of the pipeline. In some embodiments, the method is performed for a station of the pipeline to determine control decisions for the station of the pipeline.

In some embodiments, the objective function includes a model of a station of the pipeline. In some embodiments, the station of the pipeline includes multiple pumps arranged in series or parallel that are configured to pump a product through the pipeline. In some embodiments, the model of the station predicts one or more operational parameters of the station as a function of the control decisions.

In some embodiments, the control decisions are for each timestep of the future time horizon. In some embodiments, the control decisions include at least one of a setpoint for one or more pumps of the pipeline, an amount of drag reducing agent (DRA) to add to the pipeline, or an amount of energy to purchase from a utility provider to operate the pipeline.

In some embodiments, the pipeline is configured to ship any of a liquid product, a gas product, or a product including a mixture of liquid and gas. In some embodiments, the control decisions include an amount and type of additive to add to a product of the pipeline.

Another implementation of the present disclosure is a pipeline, according to some embodiments. In some embodiments, the pipeline includes multiple pipeline stations, each pipeline station including at least one pump or compressor, a pipe connecting the pipeline stations, and a controller. In some embodiments, the controller is configured to determine a mode of optimization and operation for the pipeline. In some embodiments, the controller is also configured to obtain an objective function quantifying a performance variable as a function of one or more control decisions of the pipeline over a future time horizon. In some embodiments, the controller is also configured to optimize the objective function subject to one or more constraints to determine control decisions for the pipeline that result in an optimal value of the performance variable. In some embodiments, the controller is also configured to operate the at least pump or compressor of each of the pipeline stations of the pipeline according to the control decisions.

In some embodiments, the mode of optimization includes at least one of an emissions or energy consumption mode, a monetary cost mode, or a throughput mode. In some embodiments, in the emissions or energy consumption mode, the performance variable of the objective function is energy consumption and optimizing the objective function includes minimizing the objective function to determine control decisions that result in a minimum value of the performance variable over the future time horizon. In some embodiments, in the monetary cost mode, the performance variable of the objective function is monetary cost and optimizing the objective function includes minimizing the objective function to determine control decisions that result in a minimum value of the monetary cost over the future time horizon. In some embodiments, in the throughput mode, the performance variable of the objective function is a delivered amount of product and optimizing the objective function includes maximizing the objective function to determine control decisions that result in a maximum value of delivered amount of product over the future time horizon.

In some embodiments, the controller is configured to optimize the objective function for an entirety of the pipeline to determine control decisions for the entirety of the pipeline. In some embodiments, the controller is configured to optimize the objective function for one of the pipeline stations of the pipeline to determine control decisions for the pipeline station.

In some embodiments, the objective function includes a model of at least one of the pipeline stations of the pipeline. In some embodiments, the at least one pipeline station of the pipeline includes multiple a plurality of the pumps arranged in series or parallel configured to pump a product through the pipeline, wherein the model of the pipeline station predicts one or more operational parameters of the station as a function of the control decisions.

In some embodiments, the control decisions are for each timestep of the future time horizon. In some embodiments, the control decisions include at least one of a setpoint for one or more pumps of the pipeline, an amount of drag reducing agent (DRA) to add to the pipeline, or an amount of energy to purchase from a utility provider to operate the pipeline.

In some embodiments, the pipeline is configured to ship any of a liquid product, a gas product, or a product including a mixture of liquid and gas. In some embodiments, the control decisions include an amount and type of additive to add to a product of the pipeline.

Another implementation of the present disclosure is a controller for optimizing a pipeline, according to some embodiments. In some embodiments, the controller is configured to determine a mode of optimization and operation for the pipeline. In some embodiments, the controller is configured to obtain an objective function quantifying a performance variable as a function of one or more control decisions of the pipeline over a future time horizon. In some embodiments, the controller is configured to optimize the objective function subject to one or more constraints to determine control decisions for the pipeline that result in an optimal value of the performance variable. In some embodiments, the controller is configured to operate equipment of the pipeline according to the control decisions.

In some embodiments, the mode of optimization includes at least one of an emissions or energy consumption mode, a monetary cost mode, or a throughput mode. In some embodiments, in the emissions or energy consumption mode, the performance variable of the objective function is energy consumption and optimizing the objective function includes minimizing the objective function to determine control decisions that result in a minimum value of the performance variable over the future time horizon. In some embodiments, in monetary cost mode, the performance variable of the objective function is monetary cost and optimizing the objective function includes minimizing the objective function to determine control decisions that result in a minimum value of the monetary cost over the future time horizon. In some embodiments, in the throughput mode, wherein the performance variable of the objective function is a delivered amount of product and optimizing the objective function comprises maximizing the objective function to determine control decisions that result in a maximum value of delivered amount of product over the future time horizon.

In some embodiments, the objective function includes a model of a station of the pipeline. In some embodiments, the station of the pipeline includes multiple pumps arranged in series or parallel configured to pump a product through the pipeline. In some embodiments, the model of the station predicts one or more operational parameters of the station as a function of the control decisions.

In some embodiments, the control decisions are for each timestep of the future time horizon. In some embodiments, the control decisions include at least one of a setpoint for one or more pumps of the pipeline, an amount of drag reducing agent (DRA) to add to the pipeline, or an amount of energy to purchase from a utility provider to operate the pipeline.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, systems and methods for optimization of a pipeline are shown, according to some embodiments. The pipeline includes different stations that include pumps or compressors (e.g., in series or in parallel) for pumping a product from a storage tank (e.g., a tank farm at a hydrocarbon site) to a customer, according to some embodiments. In some embodiments, the stations can include power generators (e.g., co-generation, wind turbines, solar panels, etc.) that are configured to generate energy for operation of the stations. In some embodiments, the stations also include different power storage devices (e.g., battery farms) for storing energy for later use by the stations or equipment (e.g., the pumps) thereof. In some embodiments, a controller is configured to use system information of the pipeline and equipment of the stations, utility costs, mathematical models of the different equipment of the pipeline and/or stations, sensor data from the pipeline, a mode of optimization, etc., to define an objective function. The objective function may define energy consumption, emissions, throughput, or monetary cost in terms of one or more decision variables for a future time horizon. An optimization is performed to minimize or maximize the objective function to determine optimal control decisions to at least one of minimize energy consumption, minimize emissions, minimize monetary cost, or maximize throughput. In some embodiments, the control decisions are output to the pipeline for use in operating the pipeline. The optimization can be performed locally at each station to optimize the operation of each station, or can be performed globally to optimize the overall pipeline.

Low Level Optimization

Gas Pipeline

Figure 1:
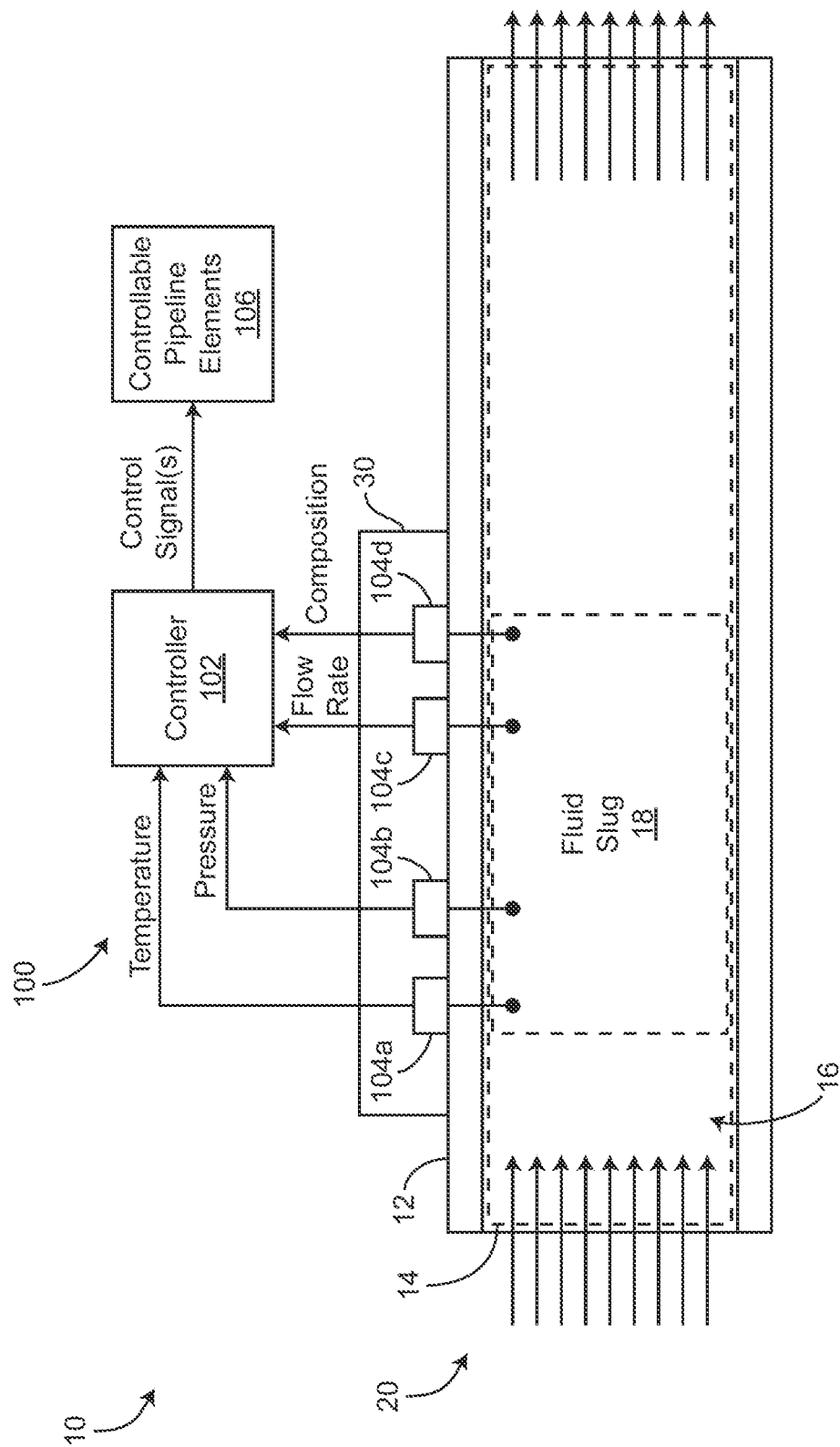
FIG. 1 is a schematic diagram of a system for a pipe system including a meter and a control system, according to some embodiments.

Referring to FIG. 1, a system 10 for monitoring a pipeline 12 (e.g., a pipeline for fluid such as gas or liquid or a mixture of the two, a pipeline for a gas such as a compressible gas, natural gas including methane and contaminants, an acid gas such as carbon dioxide and hydrogen sulfide, or a pipeline for liquids such as a natural gas, gasoline, aviation fuel, crude oil, distillates, diesel, butane, propane, ethane, etc.) is shown, according to some embodiments. The system 10 can be configured to monitor one or more conditions of a fluid 16 (e.g., a hydrocarbon, a natural gas, a gas, a liquid/gas mixture, etc.) that flows or travels within the pipeline 12. The system 10 can include a control system 100 that is configured to receive and use sensor inputs from one or more sensing units 30 that measure one or more conditions or properties of the fluid (e.g., temperature, pressure, dynamic pressure, static pressure, flow rate, etc.) to adjust operation of one or more devices of the system 10 (e.g., to affect the fluid 16 within the pipeline 12). In some embodiments, the pipeline 12 is for a crude oil, natural gas, gasoline, an acid gas (e.g., including a mixture of carbon dioxide and hydrogen sulfide) or other petroleum products including but not limited to mixtures of oil and gas products.

The pipeline 12 may be a portion of a pipeline system 20. The pipeline system 20 can be a distribution, manufacturing, or consumption system for distributing the fluid 16, manufacturing the fluid 16, or consuming the fluid 16. In some embodiments, the pipeline system 20 is configured to gather the fluid 16 (e.g., receive gas and/or oil from wells), transmit the fluid 16 (e.g., ship gas and/or oil across the country), and/or distribute the fluid 16 (e.g., distribute gas and/or oil to end customers). It should be understood that while FIG. 1 shows only a portion of the pipeline system 20, the pipeline system 20 may be more extensive, and may include any number of pipes, conduits, tubular members, etc. In some embodiments, the control system 100 as shown in FIG. 1 is repeated at various intervals down the pipeline system 20.

The fluid 16 (or other petroleum product or mixture) flowing through the pipeline 12 may be modeled as one or more fluid slugs 18. For example, the fluid slug 18 can represent a certain amount, volume, portion, or quantity of the fluid 16 that flows through the pipeline 12. The control system 100 also includes the sensing unit 30 that includes one or more sensors 104. A first sensor 104a may be configured to measure temperature of the fluid 16 (or the fluid slug 18) that flows through the pipeline 12. A second sensor 104b may be configured to measure pressure (e.g., dynamic, static, etc.) of the fluid 16 (or the fluid slug 18) that flows through the pipeline 12. A third sensor 104c can be configured to measure velocity or flow rate (e.g., volumetric flow rate, mass flow rate, etc., or any combination thereof) of the fluid 16 (or the fluid slug 18) that flows through the pipeline 12. A fourth sensor 104d can be configured to measure composition of the fluid 16 (or the fluid slug 18) that flows through the pipeline 12. For example, the fourth sensor 104d can be a collection of one or more sensors, configured to measure or detect a presence, or a concentration of any of methane, nitrogen, carbon dioxide, ethane, propane, water, hydrogen sulfide, hydrogen, carbon monoxide, oxygen, iso-butane, normal butane, iso-pentane, normal pentane, hexane, heptane, octane, nonane, decane, helium, argon, benzene, ethyl benzene, toluene, methanol, glycol, etc. It should be understood that the sensing unit 30 can include any number of sensors configured to measure other conditions or properties of the fluid 16 (or the fluid slug 18), or to measure/obtain values of properties or conditions of the fluid 16 that can be used (e.g., by a controller) to estimate or calculate other properties of the fluid 16 (e.g., using a model of a composition of the fluid 16).

In some embodiments, the fourth sensor 104d is or includes a gas chromatograph configured to obtain a sample of the fluid 16, separate chemical components of the fluid 16, and detect or sense a presence and/or concentration of each of the different chemical components of the fluid 16. The fourth sensor 104d can be configured to provide the detected presence and/or concentration of each of the different chemical components of the fluid 16 to a controller 102 of the control system 100 for use in closed loop or feedback control, according to some embodiments. In some embodiments, the fourth sensor 104d is or includes a laser interferometer configured to monitor certain chemical components of the fluid 16. In some embodiments, the fourth sensor 104d is or includes a water sensor and/or a hydrogen sulfide ($H_2S$) sensor, configured to detect a presence and/or concentration of water/moisture and/or $H_2S$.

It should be understood that the pipeline 12 as described herein may transfer a gas, a liquid, a fluid, etc. In some embodiments, the fluid 16 is a diesel fuel, gasoline, propane, etc. In some embodiments, the fluid 16 is configured to transport different types of gases or substances. For example, the pipeline 12 can be configured to transport both a diesel fuel and gasoline, according to some embodiments. When different gases or liquids or substances are transported through the pipeline 12, the different gases, liquids, or substances may mix at an interface between the different substances (resulting in a slop or transmix mixture).

The control system 100 includes the controller 102 (e.g., a programmable logic controller (PLC), a feedback controller, a processing unit, processing circuitry, etc.) that is configured to obtain sensor data from the sensing unit 30, or from the various sensors 104 of the sensing unit 30. The controller 102 can use the sensor data obtained from the sensing unit 30 to determine one or more properties (e.g., a phase) of the fluid 16 or the fluid slug 18 that flows within the pipeline 12 and can generate control decisions for one or more controllable pipeline elements 106. The controllable pipeline elements 106 may be configured to adjust an operation of the pipeline system 20 (e.g., a shut-off valve or pressure control valve) or to adjust/control one or more properties of the fluid 16 (or the fluid slug 18) that flows through the pipeline 12 (e.g., adjusting operation of a pump or compressor). In this way, the controller 102 can perform a closed-loop feedback control scheme to adjust operation of the controllable pipeline elements 106 based on real-time or current sensor data obtained from one or more of the sensing units 30. In some embodiments, temperature, pressure, flow rate and composition can be controlled by various equipment (e.g., heating coil, cooling coil, boiler, heat exchanger, port for inserting or removing material, a compressor or pump for controlling pressure, a mixer for changing homogeneity of the material. The controller 102 can also use a model of a composition of the fluid 16 (or the fluid slug 18) that flows through the pipeline 12 to estimate a phase of the fluid 16 (or the fluid slug 18). The controller 102 can generate the control signal(s) for the controllable pipeline elements 106 to maintain the fluid 16 (or the fluid slug 18) at a desired phase or at a desired temperature and pressure. The controller 102 may operate the controllable pipeline elements 106 to maintain the fluid 16 (or the fluid slug 18) at the desired phase to reduce a likelihood of the pipeline 12 fracturing, or to reduce an amount of hydrates within the fluid 16 (or the fluid slug 18) or to maintain the fluid in a certain phase or at a certain temperature or pressure.

Gas Phase Diagram

Figure 8:
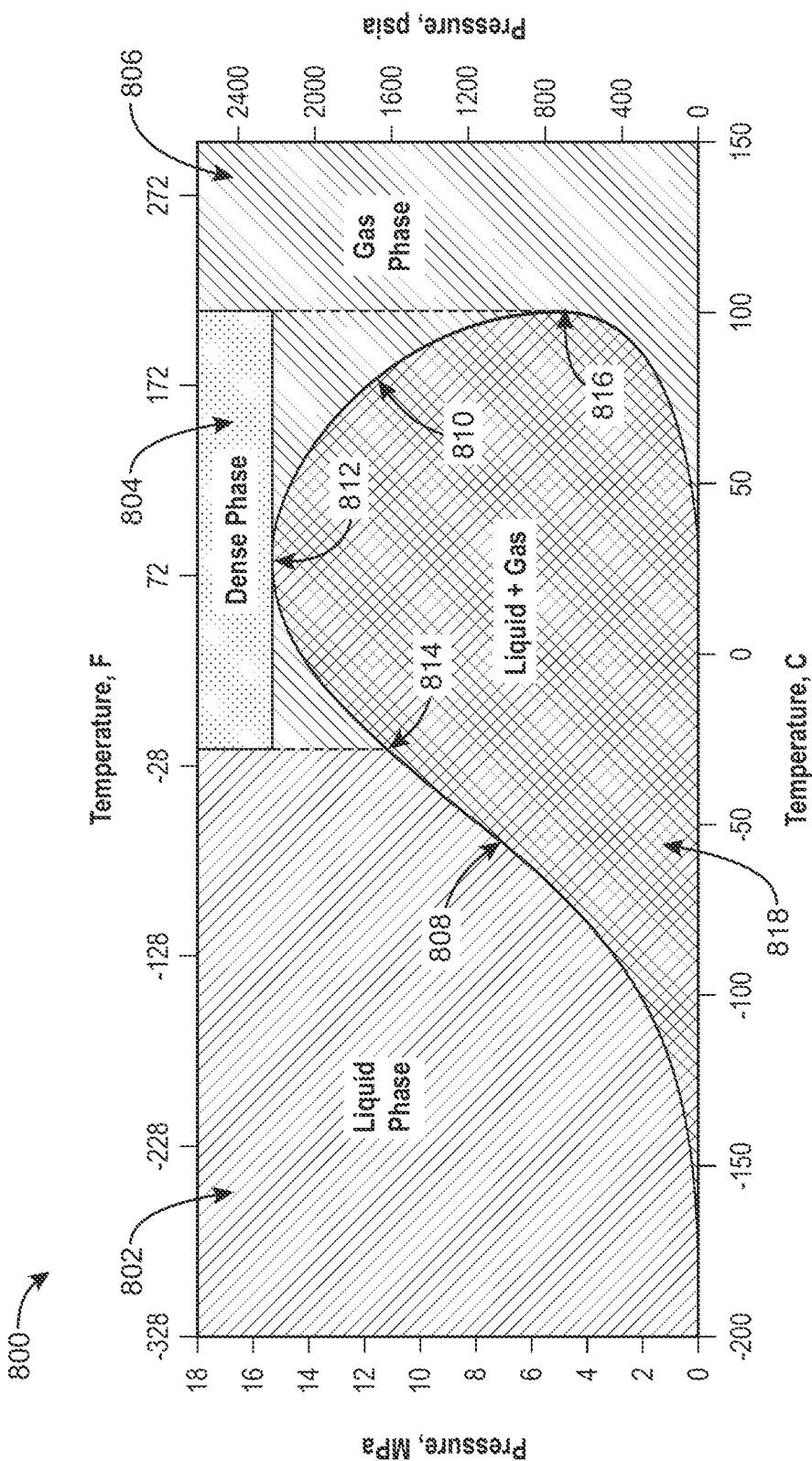
FIG. 8 is phase diagram of the fluid of the pipe system of FIG. 1, according to some embodiments.

Referring now to FIG. 8, a phase diagram 800 of the fluid 16 is shown, according to an exemplary embodiment. The phase diagram 800 includes an X-axis illustrating temperature of the fluid 16 in degrees Celsius, and a Y-axis illustrating pressure of the fluid 16 in MPa or psia. The phase diagram 800 includes a liquid and gas phase 818, a liquid phase 802, a dense phase 804, and a gas phase 806. When the fluid 16 lies within the liquid and gas phase 818, the fluid 16 (or any of the fluid slugs described herein) includes both liquid and gaseous portions. When the fluid 16 lies within the liquid phase 802, the fluid 16 (or any of the fluid slugs described herein) includes only liquid. When the fluid 16 lies within the dense phase 804, the fluid 16 can exhibit both liquid and gaseous properties (e.g., a dense fluid, a super critical fluid, etc.). When the fluid 16 lies within the gas phase 806, the fluid 16 may be entirely gaseous and can exhibit gaseous properties.

Figure 11:
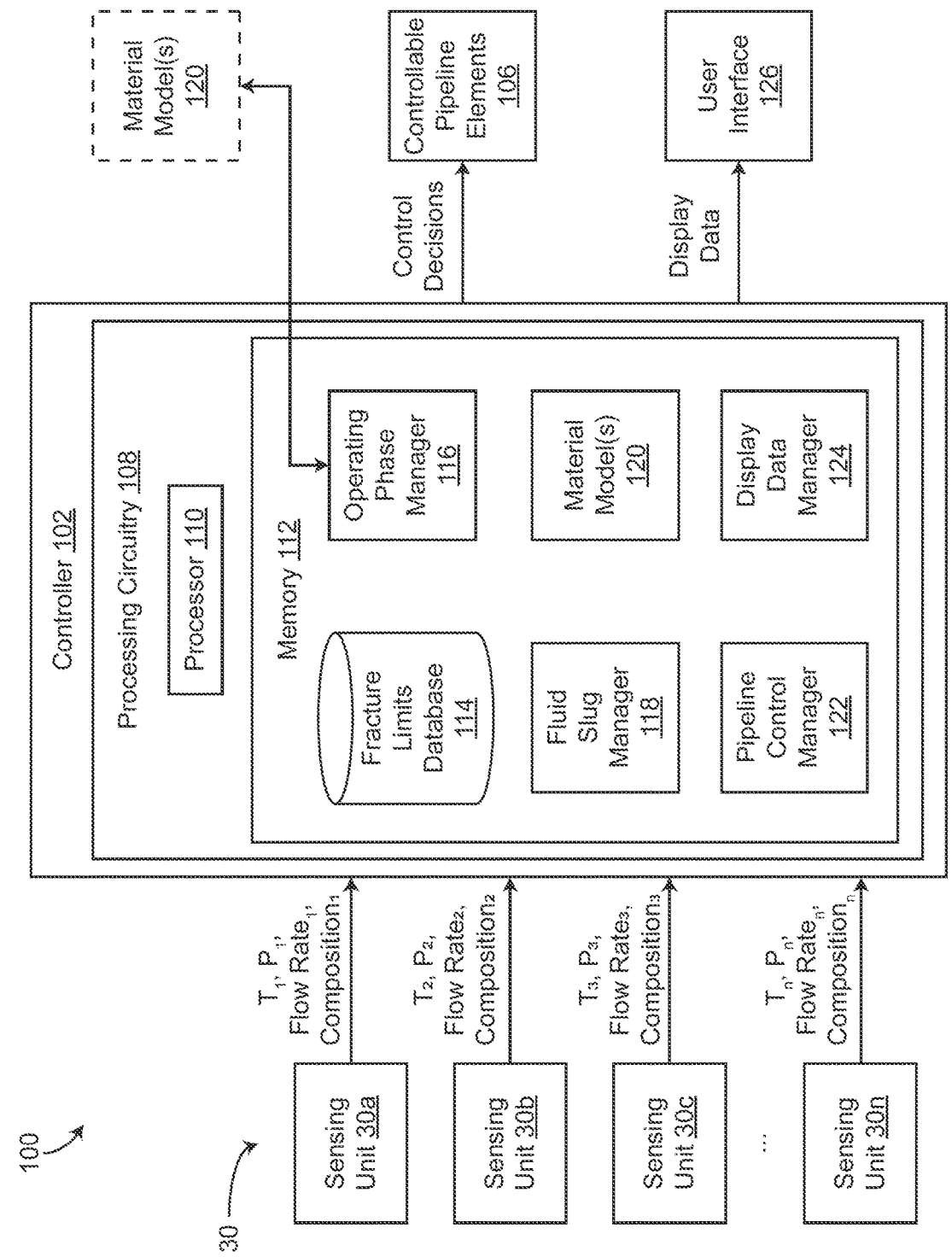
FIG. 11 is a block diagram of the control system of FIG. 1, according to some embodiments.

The phase diagram 800 also includes a bubble point curve 808 dividing the liquid phase 802 from the liquid and gas phase 818 and a dew point curve 810 that divides the gas phase 806 and the liquid and gas phase 818. The phase diagram 800 also includes a cricondenbar point 812, a critical point 814, and a cricondentherm point 816. The cricondentherm point 816 illustrates a temperature above which two states (e.g., both liquid and gas) cannot exist, regardless of pressure. The cricondenbar point 812 illustrates a pressure above which two states (e.g., both liquid and gas) cannot exist, regardless of temperature. In some embodiments, the control system 100 aims to operate the controllable pipeline elements 106 to maintain the fluid 16 within the dense phase 804 (e.g., above the cricondenbar point 812) or to maintain the fluid 16 within the gas phase 806 (e.g., above the cricondentherm point 816). The phase diagram 800 as shown may be a model (e.g., material model 120 as shown in FIG. 11) that is generated by the controller 102 for use in determining what phase the fluid 16 is currently in, and what steps should be performed to adjust or maintain the fluid 16 within the desired phase. The phase diagram 800 can be generated differently based on the composition of the fluid 16. For example, the bubble point curve 808, the critical point 814, the cricondenbar point 812, the dew point curve 810, and cricondentherm point 816, and the different phase regions defined thereof, may be based on the composition of the fluid 16, and can be different for different compositions of the fluid 16.

The phase diagram 800 can be adjusted, generated, selected, etc., based on the sensor data obtained from the sensing unit 30. For example, the phase diagram 800, or various parameters thereof (e.g., the bubble point curve 808, the critical point 814, the cricondenbar point 812, the dew point curve 810, and cricondentherm point 816) can be generated based on the composition of the fluid 16 that is obtained by the fourth sensor 104d of the sensing unit 30. In some embodiments, the model (e.g., the material model 120) provides values such as the bubble point curve 808, the critical point 814, the cricondenbar point 812, the dew point curve 810, and cricondentherm point 816 for use in a rules based control scheme for controlling pipeline elements 106. The controller 102 can use tuning PID loops. In one example, the mixture can be cooled to maximize water extraction (dehydrate) a. In some embodiments, the controller 102 causes methanol or glycol, to be injected to prevent hydrate formation based upon parameters provided from the model. In some embodiments, the model receives a composition including up to 250 compounds and provides the appropriate parameters based upon pressure composition, and temperature. The parameters can be physical constants such as specific gravity, hydrate temperature, the bubble point curve 808, the critical point 814, the cricondenbar point 812, the dew point curve 810, cricondentherm point 816, etc.

Controller Diagram

Referring now to FIG. 11, the control system 100 is shown in greater detail, according to some embodiments. The control system 100 includes the controller 102, multiple sensing units 30, the controllable pipeline elements 106, and a user interface 126 (e.g., a device including a display screen, a user input device, etc.). The controller 102 is configured to obtain sensor inputs from each of the sensing units 30 including temperature of the fluid 16, pressure of the fluid 16, flow rate (e.g., velocity, volumetric flow rate, etc.) of the fluid 16, and composition of the fluid 16. The controller 102 can use the sensor inputs in a model to determine control operations or control signals for the controllable pipeline elements 106 to maintain the fluid 16 within or at a desired phase, to reduce a likelihood of fracture of the pipeline 12, etc. The controller 102 can also generate and output display information for the display device 126 (e.g., an X-Y plot, a table, etc.) so that the display device 126 can operate to display current conditions of the fluid 16 for an operator or a technician.

The controller 102 includes processing circuitry 108 including a processor 110 and a memory 112. The processor 110 can be a general purpose or specific purpose processor, an application specific integrated circuit (ASIC), one or more field programmable gate arrays (FPGAs), a group of processing components, or other suitable processing components. The processor 110 may be configured to execute computer code and/or instructions stored in the memory 112 or received from other computer readable media (e.g., CDROM, network storage, a remote server, etc.).

The memory 112 can include one or more devices (e.g., memory units, memory devices, storage devices, etc.) for storing data and/or computer code for completing and/or facilitating the various processes described in the present disclosure. The memory 112 can include random access memory (RAM), read-only memory (ROM), hard drive storage, temporary storage, non-volatile memory, flash memory, optical memory, or any other suitable memory for storing software objects and/or computer instructions. The memory 112 can include database components, object code components, script components, or any other type of information structure for supporting the various activities and information structures described in the present disclosure. The memory 112 can be communicably connected to the processor 110 via the processing circuitry 108 and can include computer code for executing (e.g., by the processor 110) one or more processes described herein.

The memory 112 is shown to include a fracture limits database 114, an operating phase manager 116, a fluid slug manager 118, material models 120, a pipeline control manager 122, and a display data manager 124. The material model(s) 120 can be stored locally in the memory 112 of the controller 102 or may be stored remotely (e.g., in a server) which can be accessed by the controller 102 (e.g., by the operating phase manager 116), according to some embodiments. The fracture limits database 114 can store different fracture parameters that can be used by the pipeline control manager 122 to determine if adjustments should be made (e.g., to an operating pressure of the pipeline 12) to reduce a likelihood of fracture. The operating phase manager 116 can use the sensor data obtained from any of the sensing units 30 (e.g., the temperature, the pressure, the flow rate, and the composition) to determine a current phase of the fluid 16 within the pipeline 12 (e.g., to determine which phase the fluid 16 is at) using the material model(s) 120 of the fluid 16. In some embodiments, different material models 120 are used by the operating phase manager 116 based on different detected compositions of the fluid 16. The fluid slug manager 118 is configured to use the sensor data obtained from the sensing units 30 to identify one or more fluid slugs (e.g., the fluid slug 18) and track the fluid slug 18 through the pipeline system 20, according to some embodiments. The fluid slug manager 118 is configured to use the sensor data from the sensing units 30 to predict one or more conditions of the fluid 16 at a further downstream position compared to a location at which the sensor data is obtained, according to some embodiments. The pipeline control manager 122 is configured to use any of the fracture parameters as provided by fracture limits database 114, a current phase of the fluid 16 or a fluid slug as determined by operating phase manager 116 using the material model 120, or predicted conditions of the fluid 16 (e.g., as predicted by fluid slug manager 118) to determine control operations to at least one of maintain the fluid 16 at a desired phase, to maintain the fluid 16 at a desired composition, etc., by providing control signals to the controllable pipeline elements 106.

The memory 112 is shown to include the fracture limits database 114 for the pipeline 12, according to some embodiments. If an operating pressure of the pipeline 12 is below 1900 psi, fracture of the pipeline 12 may be negligible or unlikely, according to some embodiments. However, if the operating pressure of the pipeline 12 is above 1900 psi, fracture of the pipeline 12 may be more likely to occur, in combination with current conditions of the fluid 16 (or any of the fluid slugs) within the pipeline 12. For example, different compositions, temperature, pressures, or flow rates may result in a higher likelihood of fracture of the pipeline 12. The fracture limits database 114 can include a series of lookup tables that can be used to estimate a % Arrest Pipe that conditions along the pipeline 12 (e.g., the temperature, pressure, flow rate, composition, etc.) lie within. For example, the % Arrest Pipe can be determined or selected from the fracture limits database 114 based on the temperature, pressure, flow rate, composition, etc., of the fluid 16 within the pipeline 12. In some embodiments, the controller 102 seeks to maintain the % Arrest Pipe below 80%, or any other acceptable predetermined threshold value. If the % Arrest Pipe exceeds the predetermined threshold, the pipeline control manager 122 may determine one or more responsive control actions (e.g., adding additional material or an admixture to change the composition, decreasing or increasing the pressure, heating or cooling the fluid 16, etc.) to maintain the % Arrest Pipe below the predetermined threshold, according to some embodiments. In some embodiments, limits for the % Arrest Pipe, or any other limits described herein are established by regulatory agencies and/or engineering studies.

In some embodiments, the fracture limits database 114 is optional. In some embodiments, the fracture limits database 114 is an operational properties database that includes values of different parameters such as maximum operating pressure, maximum chemical injection concentrations, etc., or any other limitations or parameters within which control logic of the pipeline control manager 122 operates.

The memory 112 is shown to include the operating phase manager 116, according to some embodiments. The operating phase manager 116 is configured to use the material model 120 (e.g., a model of the composition of the fluid 16), the temperature, pressure, and the flow rate to determine what phase the fluid 16 (or one of the fluid slugs) is currently within. For example, the operating phase manager 116 can determine that the fluid 16 is currently within the dense phase 804, given the composition of the fluid 16 and based on current temperature and pressure of the fluid. Similarly, the operating phase manager 116 can determine that the fluid 16 is currently within the liquid and gas phase 818 given the composition of the fluid 16 and based on current temperature and pressure of the fluid. In some embodiments, the operating phase manager 116 is configured to use multiple different material models 120 for different compositions of the fluid 16. For example, the material models 120 may use different values or equations for the parameters of the phase diagram 800 (e.g., the bubble point curve 808, the critical point 814, the cricondenbar point 812, the dew point curve 810, and cricondentherm point 816) based on the detected composition of the fluid 16 (e.g., as detected by the fourth sensor 104d of one of the sensing units 30). In some embodiments, the material model 120 uses any of the bubble point curve 808, the critical point 814, the cricondenbar point 812, the dew point curve 810, or the cricondentherm point 816 as parameters. These parameters can be adjustable based on the detected composition of the fluid 16, according to some embodiments. For example, the operating phase manager 116 can include one or more predetermined relationships or equations for adjusting the parameters of the material model 120 based on different concentrations of the composition of the fluid 16.

In some embodiments, the operating phase manager 116 selects different material models 120 for the fluid 16 based on the detected presence of various elements, molecules, compounds, etc., of the fluid 16. For example, the operating phase manager 116 can select a specific model from a set of predetermined material models 120, each having different parameters.

The operating phase manager 116 is configured to determine what phase the fluid 16 is currently in, and can provide the phase to any of the fluid slug manager 118, the display data manager 124, the pipeline control manager 122, or the fluid slug manager 118, according to some embodiments. In some embodiments, the operating phase manager 116 is also configured to provide any of the parameters of the material model 120 (e.g., the bubble point curve 808, the critical point 814, the cricondenbar point 812, the dew point curve 810, and cricondentherm point 816) to any of the fluid slug manager 118, the pipeline control manager 122, or the display data manager 124. For example, the display data manager 124 may use the parameters of the material model 120 for presentation to an operator or user via the display device 126.

Figure 9:
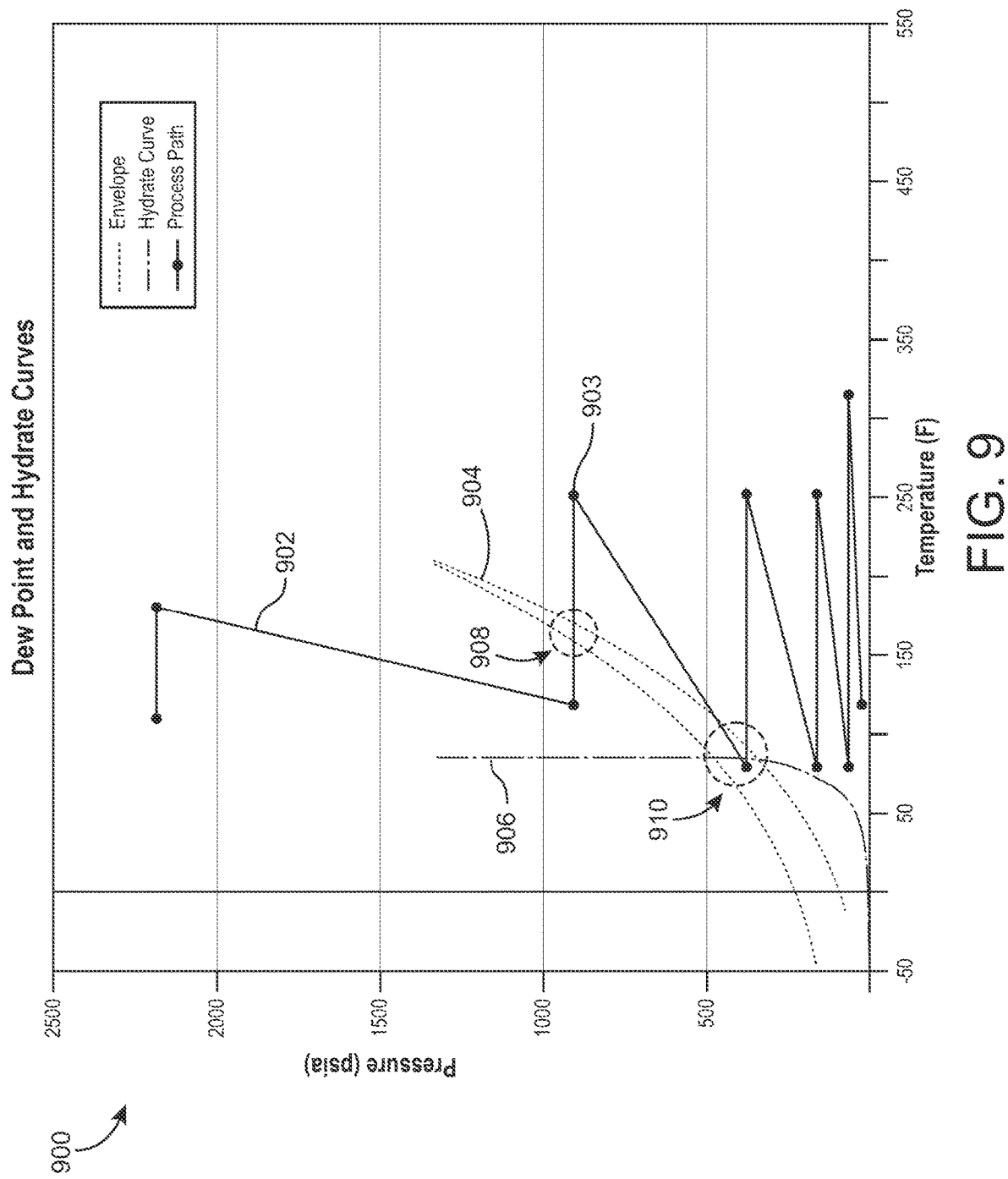
FIG. 9 is a graph showing a phase envelope curve, a hydrate curve, and a process path of the fluid of FIG. 1 before one or more control decisions have been implemented, according to some embodiments.
Figure 10:
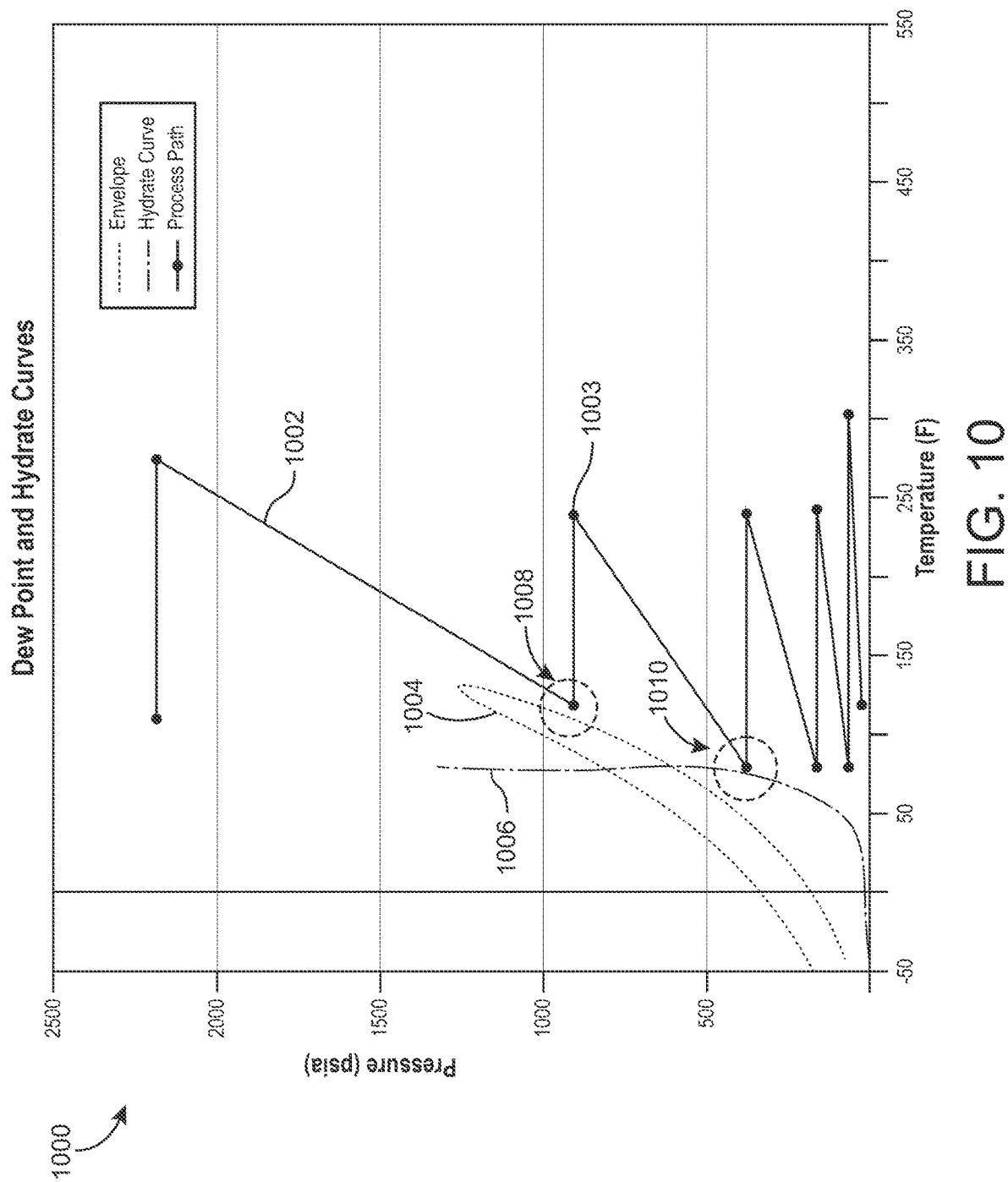
FIG. 10 is a graph showing the phase envelope curve, the hydrate curve, and the process path of the fluid of FIG. 1 after the one or more control decisions have been implemented, according to some embodiments.

The operating phase manager 116 can also provide one or more phase envelopes of the model 120 to the display data manager 124, according to some embodiments. In some embodiments, the operating phase manager 116 is also configured to use the sensor data obtained from the sensing units 30 to generate quality curves and hydrate curves (e.g., a hydrate formation curve). The operating phase manager 116 can provide the quality curves and/or the hydrate curves to display data manager 124 (and/or to fluid slug manager 118, pipeline control manager 122, fluid slug manager 118, etc.), according to some embodiments. The hydrate curves can be pressure versus temperature plots (e.g., as shown in FIGS. 9-10), according to some embodiments. In some embodiments, the operating phase manager 116 also generates an envelope curve based on the sensor data obtained from the sensing units 30. The operating phase manager 116 can also use sensor data obtained from the different sensing units 30 at different locations along the pipeline system 20 to generate a process path (e.g., temperature and pressure points at different locations along the pipeline 12).

Referring particularly to FIGS. 9-11, the operating phase manager 116 can be configured to generate graphs 900 and 1000, according to some embodiments. Graphs 900 and 1000 illustrate dew point or phase envelope curves 904 and 1004, and hydrate curves 906 and 1006 of the fluid 16. As the fluid 16 flows through the pipeline system 20, the fluid 16 may experience pressure and temperature changes, illustrated by process paths 902 and 1002. Process paths 902 and 1002 can be defined by points 903 and 1003, respectively, according to some embodiments. The points 903 and 1003 can illustrate different temperature and pressure points of the fluid 16 as recorded or measured by the sensing units 30 at different locations along the pipeline system 20. The envelope curves 904 and 1004 and the hydrate curves 906 and 1006 can be generated by the operating phase manager 116 using the material model 120, the detected composition of the fluid 16, and/or an expected composition of the fluid 16. The hydrate curves 906 and 1006 can be generated by the operating phase manager 116 based on water or moisture detected by the fourth sensor 104d of one or more of the sensing units 30 and the detected composition of the fluid 16, and/or an expected composition of the fluid 16.

Referring particularly to FIG. 9, the graph 900 illustrates the process path 902, the hydrate curve 906, and the envelope curve 904 before the controller 102 initiates one or more control decisions to adjust operation of the one or more controllable pipeline elements 106. As shown in FIG. 9, the process path 902 crosses the envelope curve 904 at path portion 908, and crosses the hydrate curve 906 at path portion 910. When the process path 902 crosses the hydrate curve 906, hydrates may form in the fluid 16, which is undesirable. In order to limit the formation of hydrates in the fluid 16, the controller 102 may determine control decisions to adjust the composition of the fluid 16 (e.g., injecting ethanol) to adjust the hydrate curve 906 and/or to adjust the envelope curve 904. Similarly, the controller 102 may determine control decisions to adjust the process path 902 (e.g., increasing or decreasing the temperature of the fluid 16 at different locations along the pipeline system 20 by applying heating or cooling to the pipeline 12, increasing or decreasing the pressure of the fluid 16 at different locations along the pipeline system 20, etc.). In some embodiments, the controller 102 operates the controllable pipeline elements 106 to affect at least one of the envelope curve 904, the hydrate curve 906, and/or the process path 902 at different locations along the pipeline system 20 so that the process path 902 does not cross the envelope curve 904 and/or the hydrate curve 906.

Referring particularly to FIG. 10, the graph 1000 illustrates the process path 1002, the hydrate curve 1006, and the envelope curve 1004 after the controller 102 initiates the one or more control decisions to adjust the operation of the one or more controllable pipeline elements 106. As shown in the comparison between FIGS. 9 and 10, the process path 1002 does not cross the hydrate curve 1006 at path portion 1010 (corresponding to path portion 910 of graph 900) and does not cross the envelope curve 1004 at path portion 1008 (corresponding to path portion 908 of graph 900). Advantageously, the controller 102 uses the sensor data obtained from the sensing units 30 (e.g., at different locations along the pipeline system 20) to construct or generate the graph 900 (e.g., using the material model 120), identify locations where hydrates may form or where the fluid 16 may transition into an undesirable phase, and implement adjustments (e.g., to the composition of the fluid 16, to the temperature and/or pressure of the fluid 16 at different locations along the pipeline system 20, etc.) to prevent/limit the formation of hydrates or to prevent/limit transition of the fluid 16 into undesirable phases (e.g., a liquid and gas phase, a liquid phase, etc.). The controller 102 can also check the sensor data obtained from the sensing units 30 after implementation of the adjustments to ensure that the adjustments successfully limit the formation of hydrates and/or limit the transition of the fluid 16 into the undesirable phases. In this way, the controller 102 can operate in a closed loop fashion using sensor data in real-time, according to some embodiments.

Figure 2:
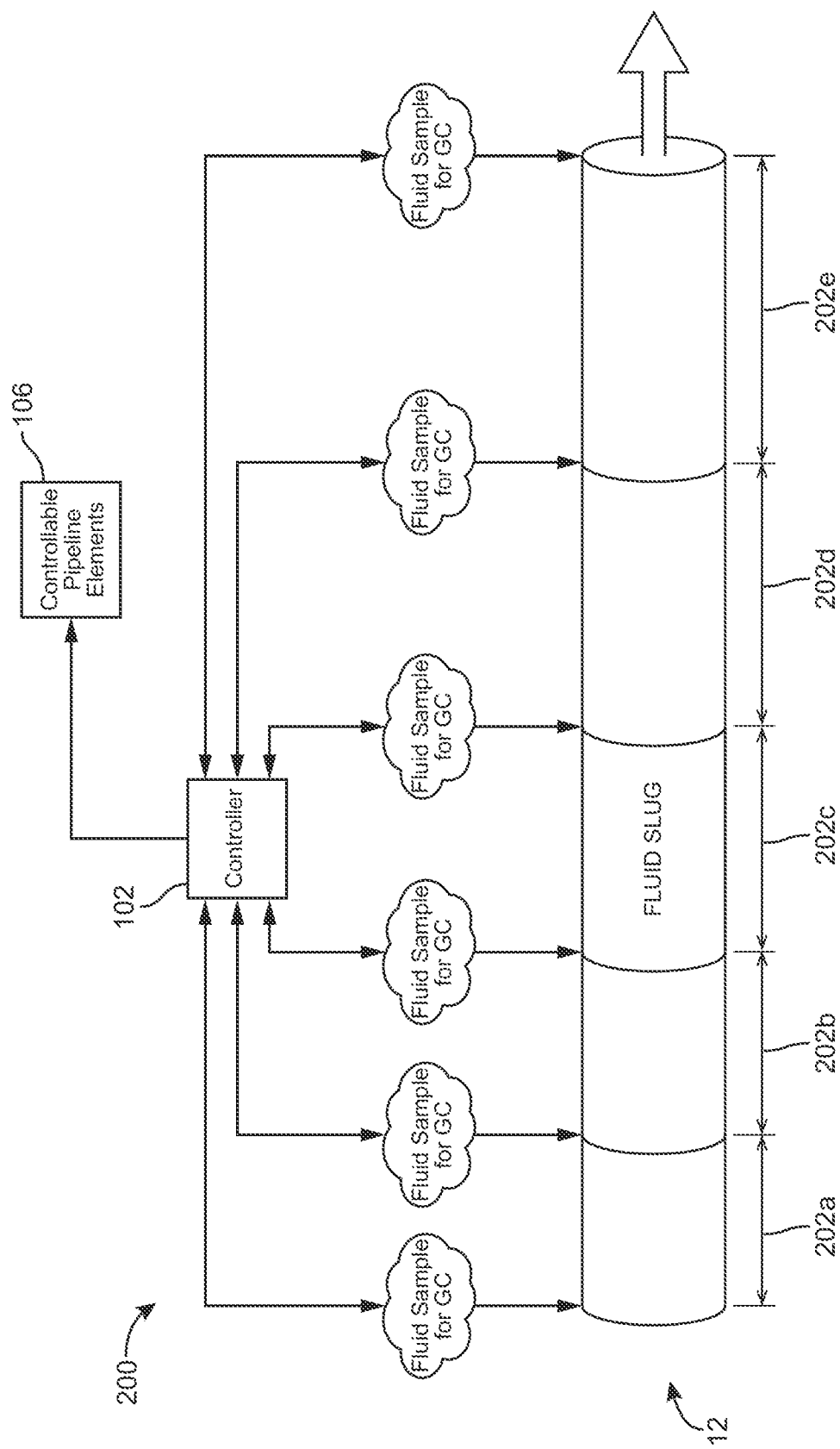
FIG. 2 is a diagram of a discrete portion of gas within the pipe system of FIG. 1 increasing in length as the discrete portion of gas flows along the pipe system, according to some embodiments.
Figure 3:
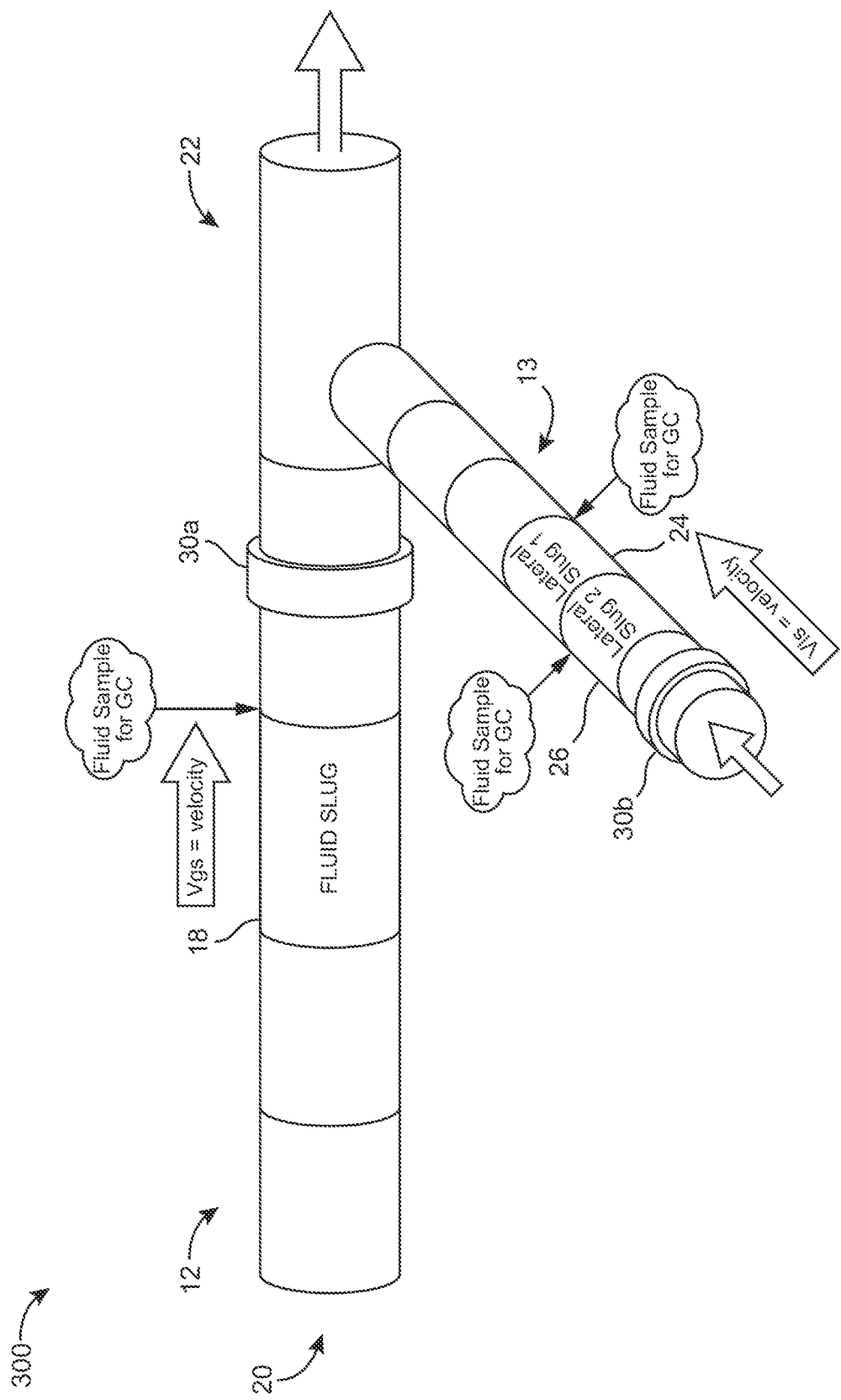
FIG. 3 is a diagram of a portion of the pipe system of FIG. 1, including a mainline and a lateral pipe line combining at a mixing point, according to some embodiments.

Referring particularly to FIGS. 11 and 2-7, the controller 102 may obtain sensor data from the one or more sensing units 30 at time intervals (e.g., every five minutes, every minute, every second, etc.), according to some embodiments. For example, the controller 102 may obtain the sensor data from the sensing unit 30a every five minutes, according to some embodiments. During the time interval, an amount of the fluid 16 or a volume of the fluid 16 may flow through the pipeline 12 (e.g., depending on a flow rate of the fluid 16 through the pipeline 12 at the sensing unit 30a). This quantity of the fluid 16 is shown in FIGS. 2-3 as fluid slug 18. As the fluid slug 18 travels through the pipeline 12, a length 202 of the fluid slug 18 may increase due to a decrease in pressure along the pipeline 12. For example, as shown in FIG. 2, the length 202 of the fluid slug 18 increases from length 202a, to length 202b, to length 202c, to length 202d, to length 202e, etc., according to some embodiments. The fluid slug 18 may increase in both volume and length 202 as it flows along the pipeline 12, according to some embodiments. In some embodiments, a standard volume of the fluid slug 18 remains the same as the fluid slug 18 travels along the pipeline 12.

The fluid slug manager 118 can be configured to monitor and track different slugs throughout the pipeline system 20, according to some embodiments. For example, the fluid slug manager 118 may track a leading edge of the fluid slug 18 as it travels through the pipeline system 20 or as the fluid slug 18 mixes with other fluid slugs (e.g., lateral slugs as described in greater detail below) to form new fluid slugs. A size of the fluid slug 18 can be calculated by the fluid slug manager 118 as:

$$V_{slug} = Q_{mainline} \times t_{sample}$$

where $V_{slug}$ is the standard volume of the fluid slug 18, $Q_{mainline}$ is the volumetric flow rate of the fluid 16 through the pipeline 12 (e.g., a predetermined value, or a measured value at a corresponding one of the sensing units 30), and $t_{sample}$ is the time interval (e.g., five minutes).

The fluid slug manager 118 can also be configured to convert the standard volume of the fluid slug 18 $V_{slug}$ to actual volume $V_{actual}$ that the fluid slug 18 occupies in the pipeline 12 in order to calculate a length of the pipeline 12 that the fluid slug 18 extends along the pipeline 12. For example, the fluid slug manager 118 can estimate the actual volume $V_{actual}$ by using the equation:

$$V_{actual} = \frac{P_{std} V_{slug}}{T_{std}} \times \frac{T_{actual}}{P_{actual}}$$

where $P_{std}$ is standard or atmospheric pressure (e.g., 14.696 psia), and $T_{std}$ is standard temperature (e.g., 59 degrees Fahrenheit), $T_{actual}$ is actual temperature of the fluid 16 as measured by the sensing unit 30, and $f_{actual}$ is actual pressure of the fluid 16 as measured by the sensing unit 30. The fluid slug manager 118 can then estimate or calculate a length $L_{slug}$ of the fluid slug 18 using the equation:

$$L_{slug} = \frac{V_{actual}}{A_{c,mainline}}$$

where $A_{c,mainline}$ is a cross-sectional area of the pipeline 12.

Figure 4:
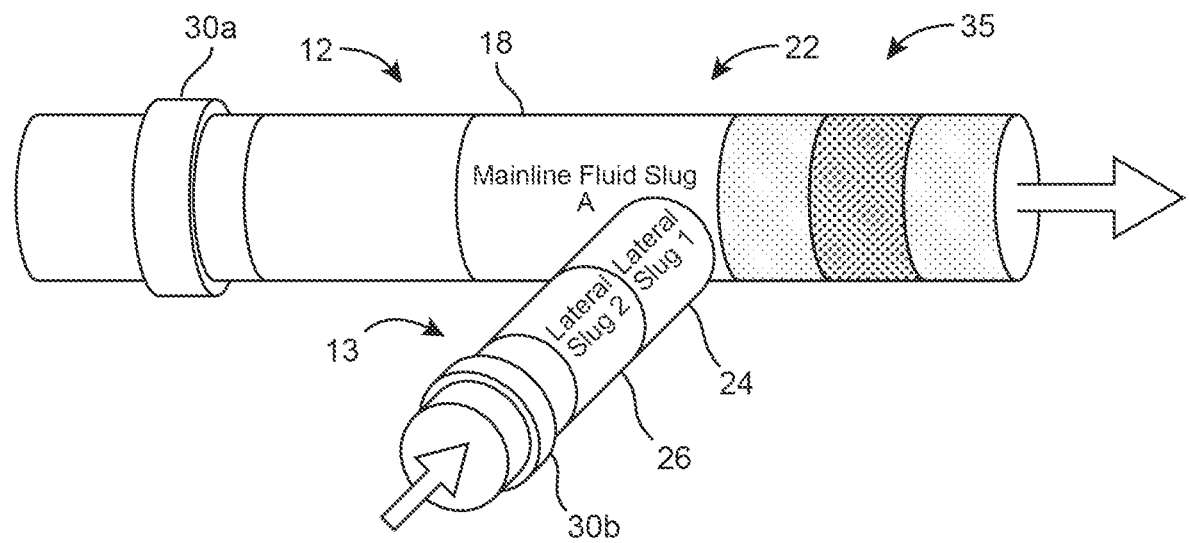
FIG. 4 is a diagram of the portion of the pipe system of FIG. 3, according to some embodiments.

The fluid slug manager 118 can use an average velocity of the fluid slug 18 (or any of the other fluid slugs described herein) as the fluid slug 18 moves down the pipeline 12 to determine an average speed of the fluid slug 18 from the sensing unit 30 to a mixing point (e.g., mixing point 22 as shown in FIGS. 3-4). The speed of the fluid slug 18 can be measured by the sensing unit 30 or may be calculated based on a measurement of flow rate (e.g., volumetric flow rate) or an expected flow rate of the fluid 16 through the pipeline 12.

The leading edge of the fluid slug 18 can be defined by a position and time at which a gas sample is taken by the sensing unit 30 for analysis, according to some embodiments. As shown in FIGS. 3-4, the pipeline 12 can intersect with a lateral pipeline 13 (e.g., an injection of one or more chemicals as determined by controller 102). As shown in FIG. 3, the pipeline 12 is a mainline, and the fluid slug 18 will be mixed with two lateral slugs 24 and 26 at the mixing point 22, according to some embodiments. In some embodiments, new fluid slugs are defined as a leading edge of the mainline, or when a lateral slug reaches the mainline at a mixing point. A blended gas composition can be calculated for the new slug (e.g., new slug 35 as shown in FIGS. 4-7).

Figure 5:
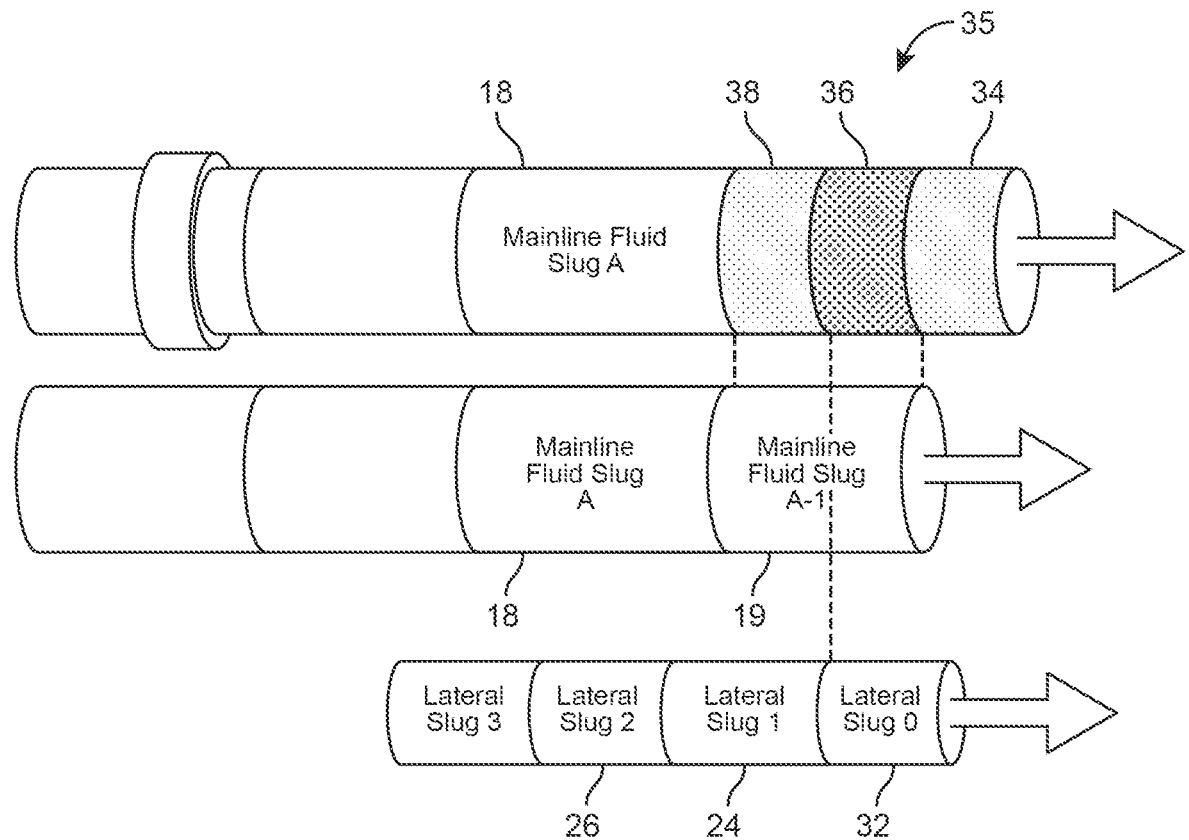
FIG. 5 is a diagram of discrete portions of mainline gas and discrete portions of lateral gas mixing to form a new discrete portion of gas, according to some embodiments.

Referring particularly to FIG. 5, the new slug 35 may include a first sub-slug 34, a second sub-slug 36, and a third sub-slug 38, according to some embodiments. In some embodiments, leading edge of the third sub-slug 38 is created when a leading edge of the fluid slug 18 reaches the mixing point 22. In some embodiments, a leading edge of the second sub-slug 36 is created when a leading edge of a first lateral slug 24 reaches the mixing point 22. In some embodiments, a leading edge of the first sub-slug 34 is created when a leading edge of a fluid slug 19 (e.g., a downstream slug relative to the fluid slug 18 along the pipeline 12) reaches the mixing point 22.

Figure 6:
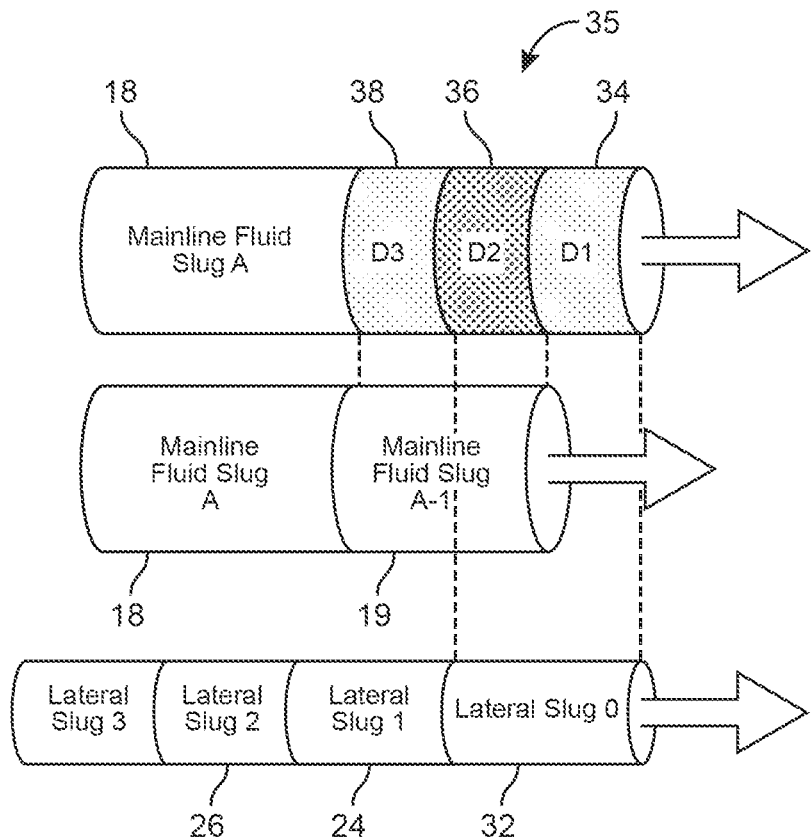
FIG. 6 is another diagram of the discrete portions of mainline gas and the discrete portions of lateral gas mixing to form the new discrete portion of gas, according to some embodiments.

Referring particularly to FIG. 6, the third sub-slug 38 can be a mixture of the fluid slug 19 and the first lateral slug 24, according to some embodiments. In some embodiments, the second sub-slug 36 is a mixture of the fluid slug 19 and a lateral slug 32 (e.g., a lateral slug that is downstream of the first lateral slug 24). In some embodiments, the first sub-slug 34 is a mixture of another fluid slug that is downstream of the fluid slug 19 along the pipeline 12 and the lateral slug 32.

Figure 7:
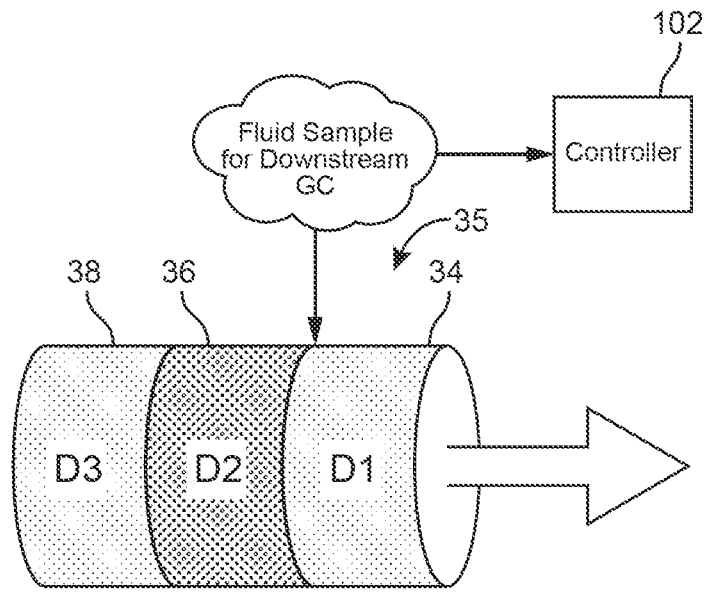
FIG. 7 is a diagram of the new discrete portion of gas of FIGS. 5-6, according to some embodiments.

Referring particularly to FIGS. 11 and 7, the controller 102 (or more specifically, the fluid slug manager 118) can track fluid slugs 18 and the new fluid slug 35 throughout the pipeline system 20, according to some embodiments. In some embodiments, the fluid slug manager 118 is configured to use sensor data regarding the composition of the fluid slug 18 and the lateral slugs 24, 26, and 32 obtained from sensing units 30 upstream of the mixing point 22, and sensing units 30 downstream of the mixing point 22 to compare compositions of the fluid 16 (or laterally provided gas, or injected chemicals such as methanol through the lateral pipeline 13. In some embodiments, the fluid slug manager 118 is configured to identify new compositions (e.g., based on sensor data from the sensing units 30) at points downstream of mixing points 22. The fluid slug manager 118 can provide the new compositions to the pipeline control manager 122 for use in determining if additional control decisions should be implemented to further adjust new composition, according to some embodiments.

Referring particularly to FIG. 11, the fluid slug manager 118 can be configured to use upstream sensor data obtained from one or more of the sensing units 30 to predict expected downstream compositions or properties of the fluid 16 (e.g., downstream of a mixing point 22), according to some embodiments. In some embodiments, the fluid slug manager 118 is configured to predict compositions of downstream, new, or mixed fluid slugs. The predicted compositions can be verified based on sensor data obtained from sensing units 30 that are downstream of the mixing point 22, according to some embodiments. In some embodiments, the fluid slug manager 118 calculates a molarity of carbon in any of the sub-slugs 34, 36, or 38 or the new slug 35. For example, the fluid slug manager 118 can calculate the molarity of carbon of the third sub-slug 38 (e.g., mole $\%_{Cx,D3}$) using the equation:

$$\text{mole } \%_{Cx,D3} = \frac{V_{ML(A-1)} \times \text{mole } \%_{Cx,ML(A-1)} + V_{LS1} \times \text{mole } \%_{Cx,LS1}}{V_{D3}}$$

where $V_{D3}$ is a volume of the third sub-slug 38, $V_{ML(A-1)}$ is volume of the fluid slug 19 (e.g., mainline fluid slug A-1), mole $\%_{Cx,ML(A-1)}$ is a carbon molarity (e.g., in percentage) of the fluid slug 19, $V_{LS1}$ is volume of the lateral slug 24, and mole %$_{Cx,LS1}$ is a carbon molarity (e.g., in percentage) of the lateral slug 24. The fluid slug manager 118 can similarly calculate or estimate predicted compositions of the second sub-slug 36, and the first sub-slug 34, according to some embodiments.

In some embodiments, the fluid slug manager 118 is configured to compare the predicted molarity (e.g., mole %$_{Cx,D3}$) of slugs that are downstream of the mixing point 22 to actual molarity (e.g., mole %$_{Cx,D3}$ as measured using sensing units 30). The comparison between upstream calculated compositions (e.g., predicted compositions) and downstream measured compositions for different slugs of gas can be used to calibrate or validate the predictions performed by the fluid slug manager 118 and/or to calibrate or validate downstream time calculations. The predicted compositions of the fluid 16 downstream of the mixing point 22, the measured compositions of the fluid 16 downstream of the mixing point 22, and/or the measured compositions of the fluid 16 upstream of the mixing point 22 can be provided to pipeline control manager 122 and/or the display data manger 124, according to some embodiments.

Referring particularly to FIG. 11, the pipeline control manager 122 is configured to use any of the outputs of the operating phase manager 116, fracture parameters from the fracture limits database 114 (e.g., % Arrest Pipe), outputs of the fluid slug manager 118, or outputs of the fluid slug manager 118, in combination with any of the sensor data obtained from the sensing units 30 to determine one or more control decisions for the controllable pipeline elements 106. The control decisions can include injection or addition of one or more chemicals or additives (e.g., an amount of propane rich gas injection, a rate at which propane rich gas is injected, ethanol, etc.) a removal of one or more substances of the fluid 16 (e.g., a removal of moisture or water), applying heating or cooling to adjust the temperature or pressure of the fluid 16, adjusting operation of one or more compressors that drive the fluid 16 through the pipeline system 20, etc., according to some embodiments. In some embodiments, the control decisions result in changes to one or more properties of the fluid 16 at different locations in the pipeline system 20. For example, the control decisions can change the composition of the fluid 16, the temperature and/or pressure of the fluid 16, a flow rate of the fluid 16, etc., so that the fluid 16 avoids the cricondentherm point 816 (e.g., so that the fluid 16 downstream of an injection site is in a desired phase, such as the dense phase 804), to reduce a likelihood of fracture of the pipeline 12, to reduce a likelihood of hydrate formation, so that the fluid 16 does not cross a hydrate curve, to reduce a likelihood of liquids or gases forming, etc.

The pipeline control manager 122 uses outputs of the operating phase manager 116 and obtained sensor data from the sensing units 30 in real-time to perform closed-loop control to maintain desired objectives (e.g., to keep the fluid 16 in a desired phase, to limit formation of hydrates in the fluid 16, to keep the fluid 16 sufficiently away from the cricondentherm point 816, to reduce a likelihood of fracture of the pipeline 12, etc.) by operating the controllable pipeline elements 106, according to some embodiments. In some embodiments, the controllable pipeline elements 106 include heating devices (e.g., heating coils, boilers, heat exchangers, etc.), cooling devices (e.g., cooling coils, heat exchangers, Joule-Thompson pressure cooling devices, etc.), injection devices (e.g., an injection system configured to inject a propane rich gas, methanol, or ethanol, etc., into the fluid 16 such as through a lateral pipeline, etc.). After the controllable pipeline elements 106 operate according to the control decisions as determined by the pipeline control manager 122, the pipeline control manager 122 can obtain new sensor data, and the operating phase manager 116, the fluid slug manager 118, the material model(s) 120, and the display data manager 124 may re-implement their functionality to provide the pipeline control manager 122 with new, updated, or re-calculated inputs (e.g., a new phase of the fluid 16 at different locations along the pipeline system 20, new model parameters such as the cricondentherm point of the fluid 16 at different locations along the pipeline system 20, etc.), according to some embodiments. The pipeline control manager 122 can then determine if new control decisions should be implemented by the controllable pipeline elements 106. For example, the pipeline control manager 122 can determine if one or more objectives (e.g., maintaining the fluid 16 in a desired phase, sufficient limitation of hydrate formation, etc.) are met, and may generate new control decisions for the controllable pipeline elements 106 if the objectives are not met.

It should be understood that the pipeline control manager 122 may operate to achieve the different objectives described herein for discrete portions of the pipeline system 20, according to some embodiments. For example, the sensing units 30 are shown to include a first sensing unit 30$a$, a second unit 30$b$, a third sensing unit 30$c$, . . . and an nth sensing unit 30$n$, each of which are positioned at different locations about the pipeline system 20, according to some embodiments. In some embodiments, the controllable pipeline elements 106 (e.g., the heating elements, the cooling elements, the injection systems, the compressors, etc.) are positioned about the pipeline system 20. In this way, the pipeline control manager 122 can perform multiple control schemes to ensure that the objectives are met at all of the different locations or portions of the pipeline system 20, according to some embodiments. For example, if the pipeline control manager 122 identifies that the fluid 16 is not in a desired phase at a particular location of the pipeline system 20 (e.g., based on the obtained sensor data from the sensing units 30 and/or outputs of the operating phase manager 116), the pipeline control manager 122 can determine one or more control decisions for controllable pipeline elements 106 that are proximate the particular location (or operate to affect the fluid 16 at the particular location) to meet the objectives at the particular location.

Referring still to FIG. 11, the display data manager 124 is configured to generate display data and provide the display data to a display device 126, according to some embodiments. The display device 126 may be a remote device, a user device, a display screen, etc., according to some embodiments. In some embodiments, the display data generated by the display data manager 124 includes a current phase of the fluid 16, the phase diagram 800 (or any other similar phase diagrams), and/or graphs 900 and 1000 (e.g., hydrate curves, envelope curves, process paths, etc.). The display data can also include any of the sensor data obtained from the sensing units 30, and/or any of the outputs, inputs, or any determined values of the fracture limits database 114, the operating phase manager 116, the fluid slug manager 118, the fluid slug manager 118, or the pipeline control manager 122, according to some embodiments. In some embodiments, the display data also includes the control decisions made by the pipeline control manager 122.

Potential Implementation Infrastructure

Figure 12:
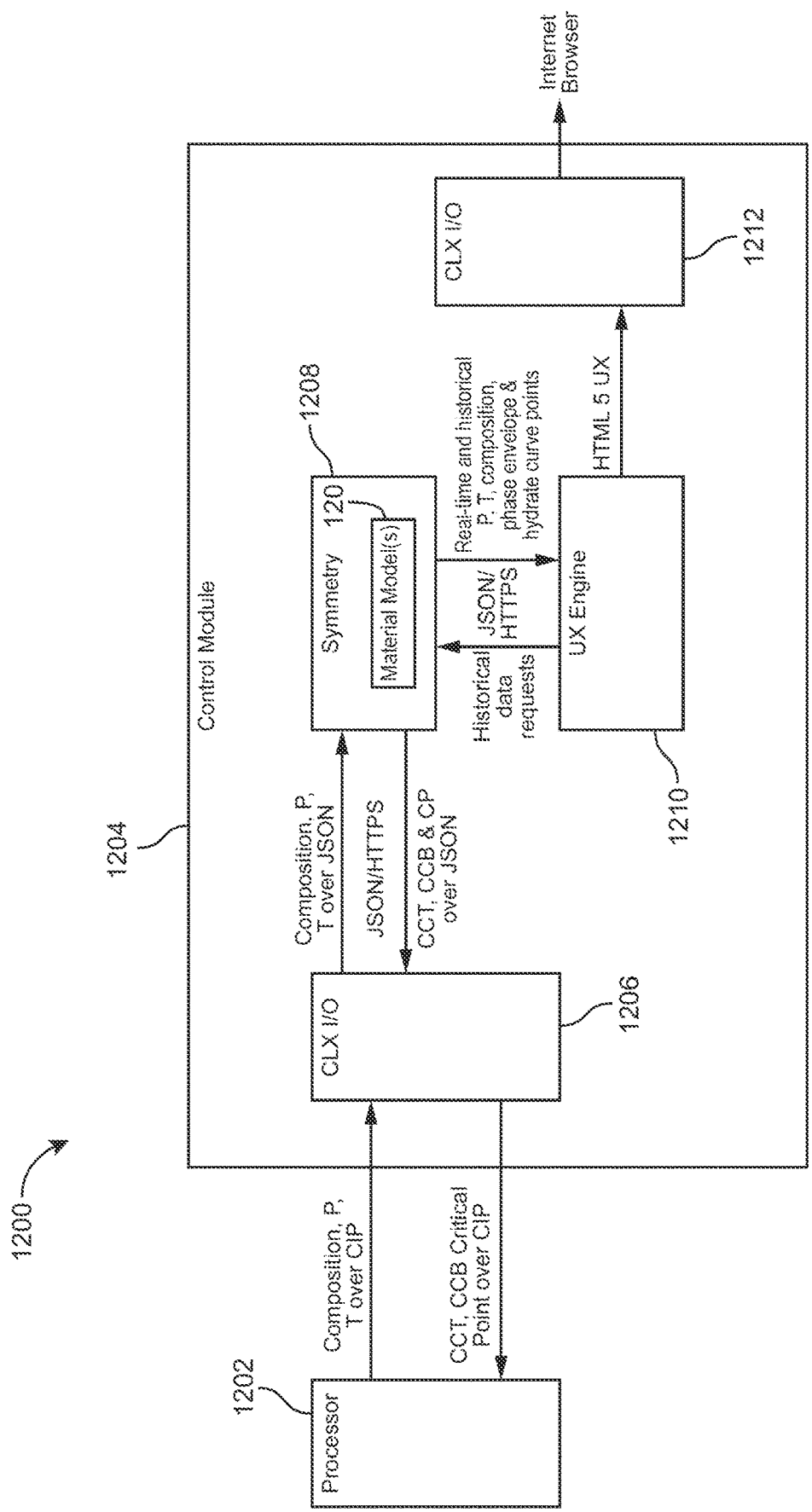
FIG. 12 is a system infrastructure on which the control system of FIGS. 1 and 11 can be implemented, according to some embodiments.

Referring particularly to FIG. 12, the control system 100 can be implemented on a system infrastructure 1200, according to some embodiments. The system infrastructure 1200 can include a control logic processor 1202, and a computer module 1204, according to some embodiments. The computer module 1204 includes an input/output (I/O) module 1206, a computing module 1208, a user experience (UX) engine 1210, and a display server 1212, according to some embodiments. In some embodiments, the control logic processor 1202 is configured to implement any of the functionality of the pipeline control manager 122. In some embodiments, the control logic processor 1202 is configured to obtain the sensor data from the sensing units 30 (e.g., temperature, pressure, composition, and flow rate) and provide the sensor data to the I/O module 1206 of the computer module 1204. The computer module 1204 may be remotely positioned from the control logic processor 1202 and communications between the computer module 1204 and the control logic processor 1202 can be wireless, according to some embodiments.

In some embodiments, the I/O module 1206 is configured to provide the sensor data (e.g., the composition, the pressure, the temperature, etc.) to the computing module 1208. In some embodiments, the computing module 1208 is configured to implement any of the functionality of the operating phase manager 116 and/or the material model(s) 120. For example, the computing module 1208 may store and use the material model(s) 120, according to some embodiments. The computing module 1208 is configured to use the sensor data and can output a value for the cricondentherm point, a value for the cricondenbar point, and a value for the critical point to the I/O module 1206, according to some embodiments. The I/O module 1206 is configured to provide the values of the cricondentherm point, the cricondenbar point, and the critical point to the control logic processor 1202 for use in generating the control decisions in a closed-loop control scheme, according to some embodiments. In some embodiments, the computing module 1208 is also configured to provide real time and historical data of the pressure, temperature, composition, phase envelope, and hydrate curve points to the UX engine 1210. In some embodiments, the UX engine 1210 is configured to perform the functionality of the display data manager 124. In some embodiments, the UX engine 1210 is configured to generate display data and provide the display data to the server 1212 as an HTML or HTML5 file. The display data can be accessed and viewed by a remote device via the display server 1212, according to some embodiments. In some embodiments, the computing module 1208 provides the real time and historical pressure, temperature, composition, phase, envelope, and hydrate curve points to the UX engine 1210 in response to receiving a historical data request from the UX engine 1210.

Process

Figure 13:
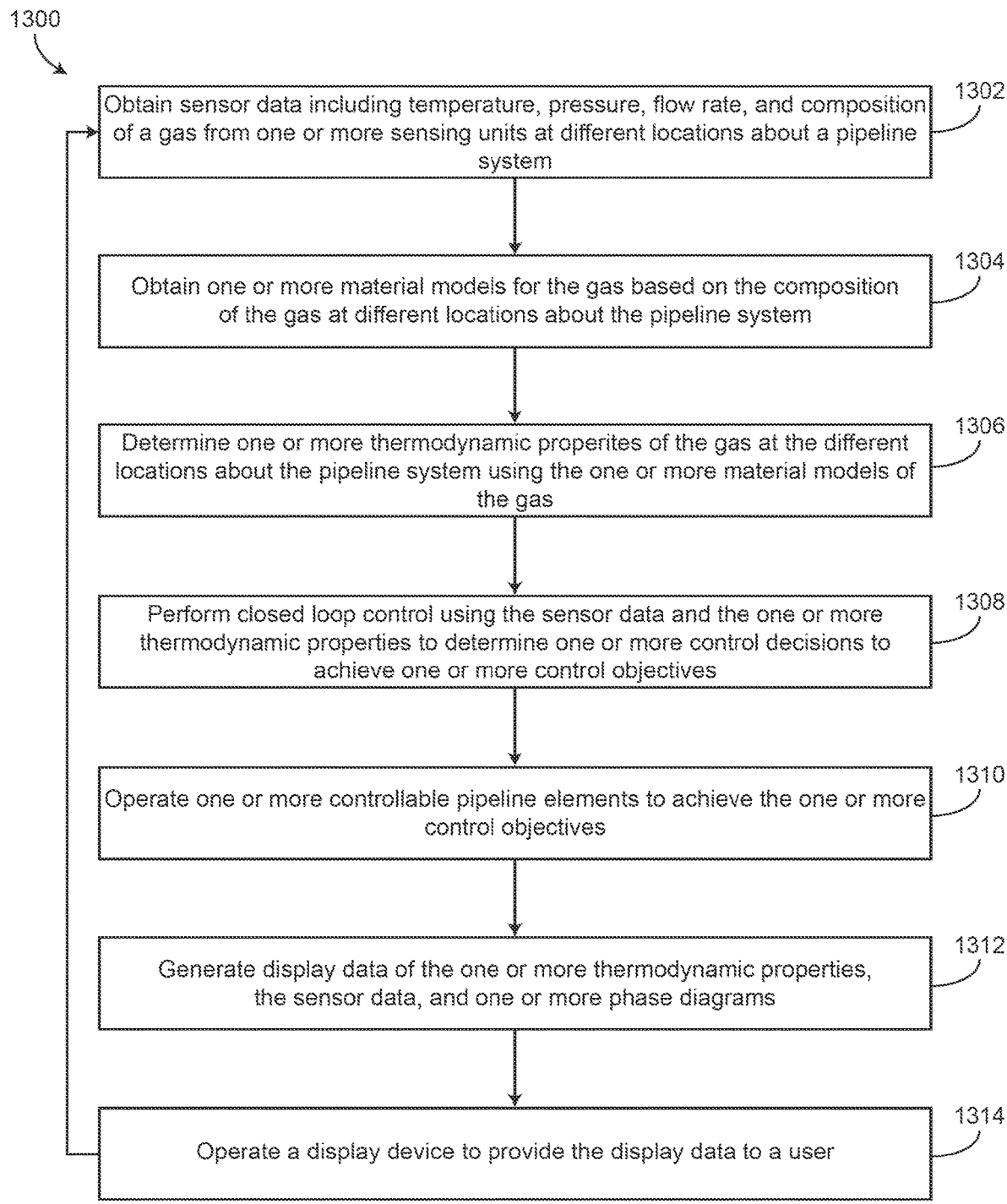
FIG. 13 is a flow diagram of a process for operating a pipeline system using a material model of a gas of the pipeline system, according to some embodiments.

Referring now to FIG. 13, a flow diagram of a process 1300 for operating a pipeline system using real-time sensor data and a material model is shown, according to some embodiments. Process 1300 includes steps 1302-1314 and can be performed by the system 10 and/or the control system 100, according to some embodiments. In some embodiments, process 1300 is performed by the system infrastructure 1200.

Process 1300 includes obtaining sensor data including temperature, pressure, flow rate, and composition of a gas from one or more sensing units that are at different locations about a pipeline system (step 1302), according to some embodiments. In some embodiments, step 1302 is performed by the sensing unit 30. For example, the temperature can be obtained by the first sensor 104*a*, the pressure can be obtained by the second sensor 104*b*, the flow rate can be obtained by the third sensor 104*c*, and the composition of the fluid can be obtained by the fourth sensor 104*d*, according to some embodiments. The sensor data can be provided from the sensing units 30 to the controller 102 and/or the control logic processor 1202, according to some embodiments.

Process 1300 includes obtaining one or more material models (e.g., the material models 120) for the fluid based on the composition of the fluid at different locations about the pipeline system (step 1304), according to some embodiments. The one or more material models may predict various thermodynamic properties of the fluid (e.g., a phase, a cricondentherm point, a cricondenbar point, a critical point, a bubble point curve, a hydrate curve, an envelope curve, a dew point curve, etc.) based on the temperature and the pressure of the fluid, according to some embodiments. In some embodiments, the one or more material models are determined, selected, or generated based on the composition of the fluid as detected by the sensing unit 30 (or more specifically, the fourth sensor 104*d*). In some embodiments, various parameters of the one or more models are adjusted based on the detected or sensed composition of the fluid. In some embodiments, step 1304 is performed by the operating phase manager 116 or the computer module 1208 (e.g., using the techniques described in greater detail above with reference to the operating phase manager 116).

Process 1300 includes determining one or more thermodynamic properties of the fluid at the different locations about the pipeline system using the one or more material models of the fluid (step 1306), according to some embodiments. In some embodiments, step 1306 includes using the one or more material models and the temperature and pressure of the fluid at different locations about the pipeline system 20 as detected by the sensing units 30. In some embodiments, step 1306 includes using the one or more material models to determine critical points, cricondentherm points, cricondenbar points, phase, etc., of the fluid at the one or more locations about the piping system 20. Step 1306 is performed by the operating phase manager 116 and/or the computer module 1208, according to some embodiments.

Process 1300 includes performing closed loop control using the sensor data and the one or more thermodynamic properties to determine one or more control decisions to achieve one or more control objectives (step 1308), according to some embodiments. In some embodiments, the sensor data that is used includes the temperature, pressure, and flow rate. In some embodiments, the one or more thermodynamic properties include a cricondentherm point, a cricondenbar point, a critical point, and a location on a phase diagram at which the fluid is (e.g., an output of the material model based on the temperature and pressure). In some embodiments, step 1308 is performed by the pipeline control manager 122 or the control logic processor 1202. In some embodiments, the one or more control objectives include limiting or preventing hydrate formation in the fluid, maintaining the fluid at a desired phase (e.g., a dense phase), maintaining the fluid above the cricondentherm point, etc. In some embodiments, the one or more control decisions include injecting an additive (e.g., adding propane, thereby adjusting the composition of the fluid) to the fluid, applying heating or cooling (to adjust the temperature), adjusting a compressor operation (to adjust the pressure), etc. The pipeline control manager 122 may implement a PID control scheme to determine control decisions to meet the control objectives, according to some embodiments.

Process 1300 includes operating one or more controllable pipeline elements to achieve the one or more control objectives (step 1310), according to some embodiments. In some embodiments, step 1310 includes providing the one or more control decisions from the controller 102 (e.g., the pipeline control manager 122) to the controllable pipeline elements 106. In some embodiments, the controllable pipeline elements include injection systems for pumping or injecting an additive to the fluid, a heating element (e.g., a heating coil), a cooling element, a compressor, a separator, etc. The controllable pipeline elements are the controllable pipeline elements 106, according to some embodiments.

Process 1300 includes generating display data of the one or more thermodynamic properties, the sensor data, and one or more phase diagrams (step 1312), according to some embodiments. The one or more thermodynamic properties can include a cricondentherm point, a cricondenbar point, a critical point, an operating location of the fluid on a phase diagram, etc., according to some embodiments. In some embodiments, the sensor data includes the temperature of the fluid, the pressure of the fluid, the flow rate of the fluid, and/or the composition of the fluid. In some embodiments, the phase diagram includes a hydrate curve, an envelope curve, a process path, etc. In some embodiments, the one or more phase diagrams include graphs or charts similar to the graph 900, the graph 1000, or the phase diagram 800. In some embodiments, step 1312 is performed by the display data manager 124 and/or the UX engine 1210.

Process 1300 includes operating a display device to provide the display data to a user (step 1314), according to some embodiments. In some embodiments, the display device is the display device 126. In some embodiments, the display device is configured to access the display data via a server or a webpage (e.g., the server 1212).

The attached appendix describes various exemplary embodiments of the systems and methods described herein as well as exemplary system architectures, frameworks, operating environments, or the like in which the systems and methods described herein may be implemented. The systems of the present disclosure may include any of the hardware, software, or other components described in the appendix and may be configured to perform any of the functions described in the attached appendix. Similarly, the methods or processes of the present disclosure may include any of the processing steps described in the appendix. In some embodiments, the systems and methods described herein may be implemented using or in combination with any of the systems, methods, or other features described in the appendix. It should be understood that the disclosure provided in the appendix is provided as an example only and should not be regarded as limiting.

High Level Optimization

Referring to FIGS. 14-20 various systems and methods for performing a high level optimization of a pipeline are shown, according to some embodiments. In some embodiments, the high level optimization can be performed to determine how to operate various pumps of the pipeline, and/or to determine an amount of drag reducing agent (DRA), diluent, or other additives that should be injected to the pipeline, where the DRA should be injected, when the DRA should be injected, when to use electrical energy from a utility provider or from energy storage, etc., or otherwise operate the pipeline in order to minimize energy consumption of the pipeline, minimize emissions produced by the pipeline system, minimize costs associated with operating the pipeline, or maximize throughput of product through the pipeline. In some embodiments, the high level optimization can be performed for the entire pipeline to determine optimal control decisions for the pipeline over a future time period (e.g., a future time horizon). In some embodiments, the high level optimization is performed at each of multiple stations of the pipeline independently so that each station operates to optimize its throughput, emissions, energy consumption, costs of operation, etc.

Pipeline System

Figure 14:
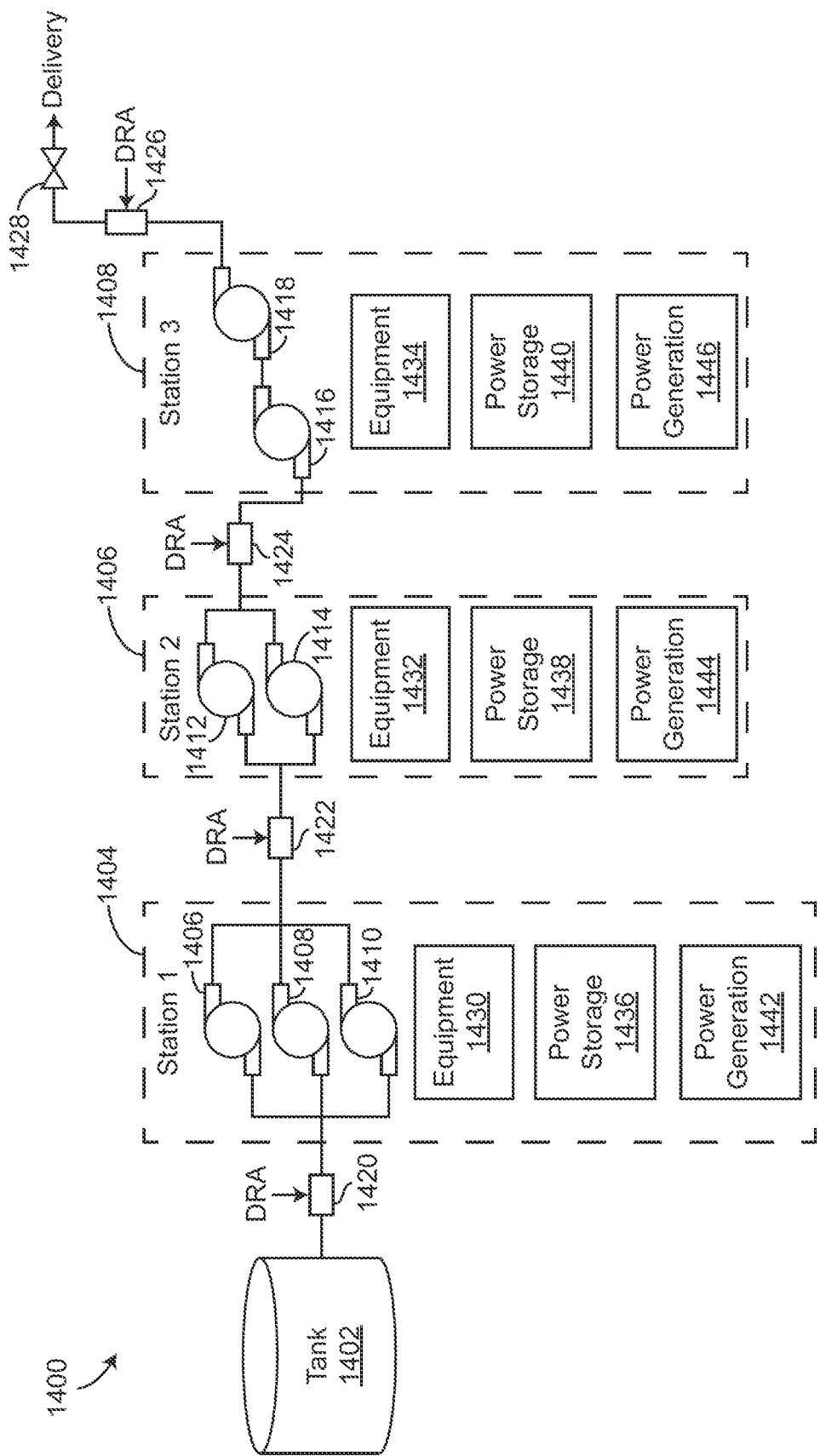
FIG. 14 is a block diagram of a pipeline system including different stations, according to some embodiments.

Referring to FIG. 14, a pipeline 1400 is shown, according to some embodiments. Pipeline 1400 includes a tank 1402 that is configured to store a product for transmission to a customer, according to some embodiments. In some embodiments, the product includes any of a diesel fuel, a gasoline fuel, fuel oil, jet fuel, or any other hydrocarbon fluid. In some embodiments, the tank 1402 is or includes multiple tanks (e.g., a tank farm) that are configured to store and discharge the product. In some embodiments, the product is stored in the tank 1402 as a liquid.

The pipeline 1400 also includes a first station 1404, a second station 1406, and a third station 1408, according to some embodiments. In some embodiments, each of the stations 1404-1408 include one or more pumps that are configured to drive flow of the product through the pipeline 1400. For example, the first station 1404 includes pumps 1406-1410, the second station 1406 includes pumps 1412-1414, and the third station 1408 includes stations 1416-1418, according to some embodiments. The pumps 1406-1418 of the stations 1404-1408 are configured to operate to pump the product from the tank 1402 to a delivery site (e.g., a customer), according to some embodiments. In some embodiments, the pumps 1406-1414 are arranged in parallel (e.g., at stations 1404 and 1406), and the pumps 1416-1418 are arranged in series (e.g., at station 1408). It should be understood that while only three stations, stations 1404-1408, are shown, the pipeline 1400 can include any number of stations that include any number of pumps in series, in parallel, or any combination thereof.

In some embodiments, the pumps 1406-1410 are arranged in parallel at stations 1404 to facilitate the use of smaller pumps that can operate in unison to pump a large volume of product. In some embodiments, the pumps 1416 and 1418 of station 1408 are arranged in series to raise the pressure of the product before delivery of the product to a customer. For example, if there is an elevation change from the station 1408 to the customer, the arrangement of the pumps 1416 and 1418 in series can facilitate raising the pressure of the product to drive the product to the higher elevation where the customer is.

As shown in FIG. 14, each of the stations 1404-1408 include equipment 1432-1434 (e.g., transformers, controllers, electric motors, internal combustion engines, etc.) configured to operate the pumps of the station, according to some embodiments. In some embodiments, the station 1404 includes equipment 1430 that is configured to operate the pumps 1406-1410. In some embodiments, the station 1406 includes equipment 1432 that is configured to operate pumps 1412-1414. In some embodiments, the station 1408 includes equipment 1434 that is configured to operate the pumps 1416-1418.

Each of the stations 1404-1408 also include power storage, shown as power storage 1436, power storage 1438, and power storage 1440, according to some embodiments. In some embodiments, the power storage 1436-1440 is configured to store electrical energy that is provided by a utility provider (e.g., an energy provider) or that is generated locally at the stations 1404-1408. The power storage 1436-1442 may include capacitors, batteries, battery farms, etc., configured to be charged with electrical energy and discharged to the equipment 1430-1434 for use in operating the stations 1404-1408 or pumps thereof.

In some embodiments, each of the stations 1404-1408 also include power generation equipment 1442-1446. For example, the station 1404 may include power generation equipment 1442, the station 1406 can include power generation equipment 1444, and the station 1408 can include the power generation equipment 1446, according to some embodiments. In some embodiments, the power generation equipment 1442-1446 are or include wind turbines, solar panels, water wheels, hydroelectric generators, diesel generators, etc., configured to generate electrical energy for use by the equipment 1430-1434 and/or to be stored in any of power storage 1436-1440 for later use by the equipment 1430-1434 to operate the pumps 1406-1418.

In some embodiments, the pipeline 1400 includes DRA addition points 1420-1426 where a DRA can be introduced to the pipeline 1400 to reduce friction and improve efficiency of the pipeline 1400 (e.g., reduce power consumption, operational costs, etc., of the stations 1404-1408). In some embodiments, the DRA, when injected or introduced to the product in the pipeline 1400, reduces energy required to push the product through the pipeline 1400. In some embodiments, the type of product in the pipeline 1400 determines how much DRA can be introduced. For example, if the product that is being shipped through the pipeline 1400 is jet fuel, then no DRA can be provided to the product. Similarly, diesel, gasoline, fuel oil, etc., may have different DRA requirements. In this way, an amount of DRA that is provided to the product of the pipeline 1400 can be determined based on the type of product that is currently being shipped through the pipeline 1400. In some embodiments, the DRA is a chemical additive that reduces friction between the product and an interior of pipes of the pipeline 1400. In some embodiments, the DRA may have a molecular structure that is 10-12 inches in length. In some embodiments, when the DRA passes through the pumps 1406-1418, the molecules of the DRA are cut or severed by blades or turbines of the pumps 1406-1418. Additional DRA can then be introduced at a location downstream of the pumps. For example, as shown in FIG. 14, a DRA addition point 1422 is downstream of the pumps 1406-1410 of the station 1404, a DRA addition point 1424 is downstream of the pumps 1412-1414 of the station 1406, and a DRA addition point 1426 is downstream of the pumps 1416-1418 of station 1408.

In some embodiments, the stations 1404-1408 are positioned 40-100 miles apart. In this way, when the product leaves the station 1404 it may travel until it reaches the station 1406, where it is again pressurized so that it can reach the third station 1408. In some embodiments, multiple different products are provided through the pipeline 1400 at once. For example, jet fuel, diesel fuel, gasoline, different grades of gasoline, etc., can all be shipped through the pipeline 1400 to a delivery location (e.g., a customer). The different products can be shipped through the pipeline 1400 as different slugs of product. For example, a first product can be first introduced to the pipeline 1400 and may travel through the pipeline 1400 as a first slug, while a second product is introduced to the pipeline 1400 after the first product and travels through the pipeline 1400 as a second slug. In some embodiments, the first slug and the second slug mix with each other at their borders to form a transmix. In some embodiments the transmix is removed from the pipeline 1400 when the product reaches its destination and sent to a refinery. In some embodiments, for similar types of products transmix is acceptable and is not removed and sent to a refinery. For example, if different grades of gasoline mix, this transmix may be acceptable and does not require removal and refining. Acceptable transmix can be tracked through the pipeline system 20 using any of the techniques as described in greater detail above with reference to FIGS. 1-7.

Optimization Controller

Figure 15:
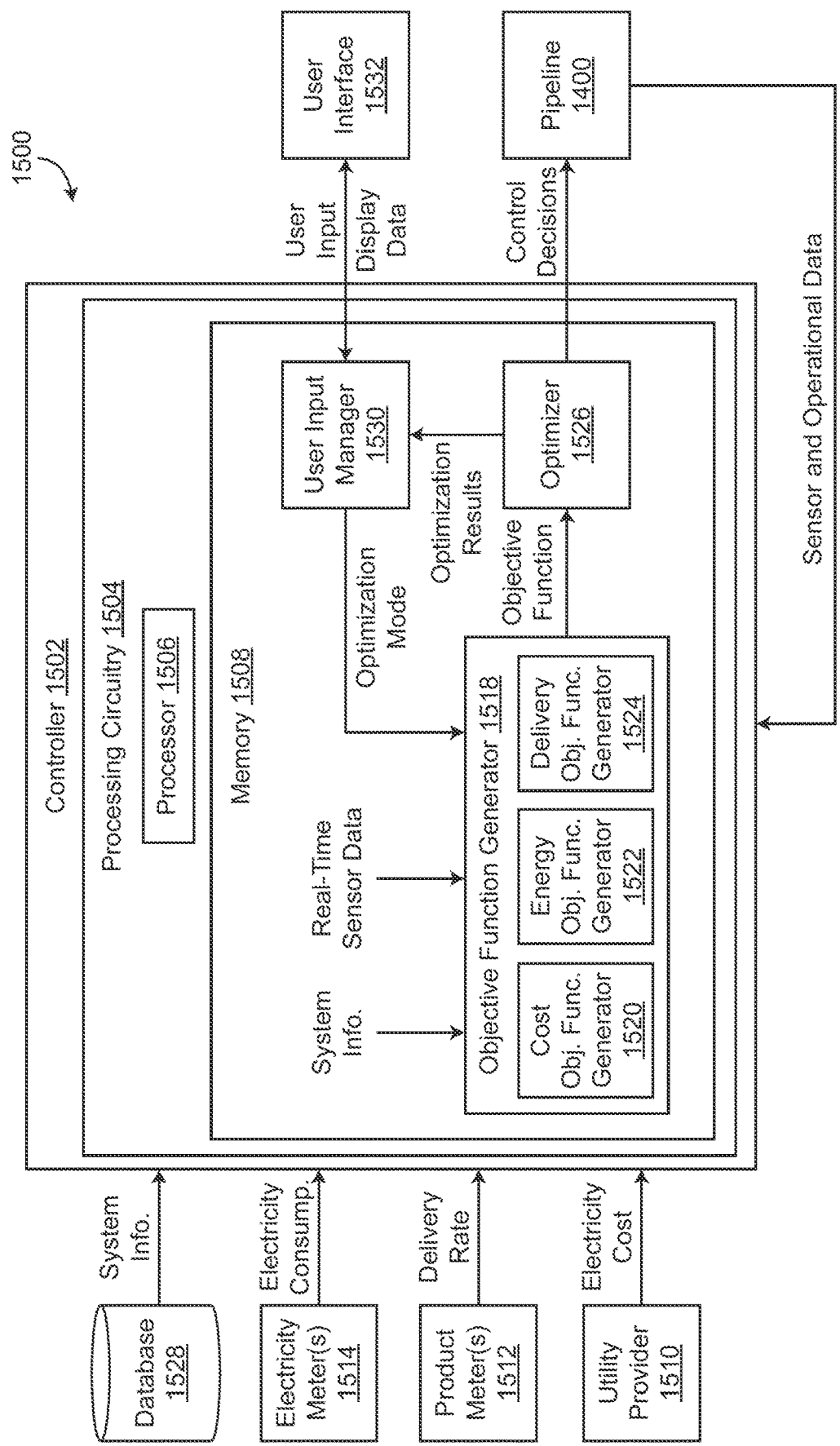
FIG. 15 is a block diagram of a controller configured to perform an optimization for the pipeline system of FIG. 14, or a station of the pipeline system of FIG. 14, according to some embodiments.

Referring particularly to FIG. 15, a system 1500 for optimizing operation of the pipeline 1400 is shown, according to some embodiments. In some embodiments, the system 1500 is configured to generate control decisions for the pipeline 1400 to operate the pipeline 1400, equipment, pumps, DRA introduction, etc., optimally. In some embodiments, the system 1500 includes a controller 1502, a database 1528, electricity meters 1514, product meters 1512, a user interface 1532, and the pipeline 1400. In some embodiments, the database 1528 is stored locally on the controller 1502, or stored on a cloud computing system. In some embodiments, the electricity meters 1514 and the product meters 1512 are components or sensors of the pipeline 1400. In some embodiments, the controller 1502 is configured to receive system information of the pipeline 1400 from the database 1528, electricity consumption data of various components of the pipeline 1400 from the electricity meters 1514, delivery rate or quantity data from the product meters 1512 of the pipeline 1400, electricity costs, forecasts, or schedules from a utility provider 1510, and sensor and/or operational data from the pipeline 1400 or sensors thereof (e.g., pressure sensors, flow meters, temperature sensors, etc.). In some embodiments, the controller 1502 is also configured to receive one or more user inputs from the user interface 1532 indicating a desired optimization mode for the controller 1502. In some embodiments, the controller 1502 is configured to operate the user interface 1532 to display optimization results. In some embodiments, the controller 1502 is configured to provide control decisions to the pipeline 1400 to operate the pipeline 1400 according to the control decisions that are generated as a result of the optimization. In some embodiments, if electricity meters 1514 are not provided or used, electric use can be estimated based on process conditions and pump curves (e.g., integrating an amount of energy consumed over time). In some embodiments, the electric use is calculated by the controller 1502.

The controller 1502 includes processing circuitry 1504 including a processor 1506 and a memory 1508. The processor 1506 can be a general purpose or specific purpose processor, an application specific integrated circuit (ASIC), one or more field programmable gate arrays (FPGAs), a group of processing components, or other suitable processing components. The processor 1506 may be configured to execute computer code and/or instructions stored in the memory 1508 or received from other computer readable media (e.g., CDROM, network storage, a remote server, etc.).

The memory 1508 can include one or more devices (e.g., memory units, memory devices, storage devices, etc.) for storing data and/or computer code for completing and/or facilitating the various processes described in the present disclosure. The memory 1508 can include random access memory (RAM), read-only memory (ROM), hard drive storage, temporary storage, non-volatile memory, flash memory, optical memory, or any other suitable memory for storing software objects and/or computer instructions. The memory 1508 can include database components, object code components, script components, or any other type of information structure for supporting the various activities and information structures described in the present disclosure. The memory 1508 can be communicably connected to the processor 1506 via the processing circuitry 1504 and can include computer code for executing (e.g., by the processor 1506) one or more processes described herein.

Referring still to FIG. 15, the memory 1508 includes an objective function generator 1518, an optimizer 1526, and a user input manager 1530, according to some embodiments. In some embodiments, the objective function generator 1518 is configured to receive a desired or selected optimization mode from the user input manager 1530 as provided by the user input. In some embodiments, the objective function generator 1518 includes a cost objective function generator 1520, an energy objective function generator 1522, and a delivery objective function generator 1524. The objective function generator 1518 is configured to receive system information and/or real-time sensor data to generate the objective function according to the optimization mode, according to some embodiments. In some embodiments, the system information is the system information provided by the database 1528. The system information can include information regarding equipment, equipment models, inter-relationships between the different equipment, stations, pumps, etc., layout, etc., of the pipeline 1400. In some embodiments, the system information includes models of the different stations (e.g., stations 1404-1408), or mathematical models of the various components of the equipment of the stations 1404-1408. For example, the models of the different stations may be equipment performance curves, mathematical equations, multi-dimensional graphs, etc., showing modeled or predicted operation of the stations 1404-1408 with respect to different control decisions (e.g., how much energy the station 1404 consumes if operated to drive the product through the pipeline 1400 with a particular flow rate if all the pumps 1406-1410 are operational, how much energy the station 1404 consumes if operated to drive the product through the pipeline 1400 with the particular flow rate if only one or two of the pumps 1406-1410 are operational, etc.). In some embodiments, the system information also includes information regarding distance between the stations 1404-1408, elevation changes between the stations 1404-1408, etc. In some embodiments, the models of the stations 1404 predict or estimate one or more output variables (e.g., energy consumption, output flowrate, delivery rate of product, output emissions, cost of operation, etc.) as a function of one or more input variables (e.g., operating parameters of the pumps of the stations, amount of energy charged or discharged from the power storage 1436, power generation, weather data, type of product being shipped through the station, etc.).

In some embodiments, the real-time sensor data includes the electricity consumption, the delivery rate, the electricity costs, and/or the sensor and operational data. In some embodiments, the real-time sensor data is used by the objective function generator 1518 to generate the objective function.

When the optimization mode is selected to optimize energy consumption, the objective function generator 1518 implements the energy objective function generator 1522 and generates an objective function that quantitatively predicts or estimates energy consumption of the pipeline 1400 or of a single station of the pipeline 1400 as a function of one or more control decisions (e.g., operation of the pumps 1406-1418) subject to one or more constraints. In some embodiments, the objective function includes models of one or more of the stations of the pipeline 1400 or components of the stations (e.g., pump models, pump curves, etc.) to predict or output performance variables or the energy consumption of each of the stations or components of the stations.

For example, the objective function may express energy consumption of the pipeline 1400 over a future time horizon subject to one or more constraints. The energy consumption objective function can have the form:

$$E(x) = \sum_{k=1}^{m} (\text{Component or Station Energy Costs})_k$$

where k is a time step in an optimization period or time horizon, m is a total number of timesteps in the optimization period or time horizon, and x is a set of decision or controllable variables for the optimization.

In some embodiments, the optimization has the form:

minimize $E(x)$ so that the optimizer 1526 is configured to determine values for the decision or control variables x that minimize the total energy consumption E over the optimization period or the time horizon.

In some embodiments, the decision variables x are or include flow rates or pressures across the different pumps 1406-1418, or across the stations 1404-1408. For example, an nth pump may have a function or model:

$$E_{pump,n} = f_{pump,n}(x)$$

where $E_{pump,n}$ is an estimated amount of energy used by the nth pump to operate to achieve the x control decision (e.g., a flowrate Q, a pressure differential $\Delta p$, etc.) over a time step or instantaneously, and $f_{pump,n}$ is a function for the nth pump that predicts energy usage as a function of the control or decision variable.

In some embodiments, the inputs for the model of the nth pump include an amount or quantity of DRA that is introduced to the pipeline 1400, a location at which the amount or quantity of DRA is introduced to the pipeline 1400, a type of product that is currently being shipped through the pipeline 1400, etc. For example, the nth pump may have a function or model:

$$E_{pump,n} = f_{pump,n}(x_{\Delta p}, x_{DRA}, x_{DRA,loc}, x_{product})$$

where $x_{\Delta p}$ is a pressure differential across the nth pump, $x_{DRA}$ includes one or more quantities of DRA that are introduced to the pipeline, $x_{DRA,loc}$ is a location that the one or more quantities of DRA are introduced to the pipeline 1400, and $x_{product}$ is a type of product that is being pumped through the pipeline 1400, or a type of product of a slug that is pumped through the pipeline 1400.

In some embodiments, the energy objective function is minimized subject to one or more constraints. In some embodiments, the constraints include limits on the pressurization of each of the pumps, runtime of the pumps, limits on an amount of DRA that can be introduced to the product based on the type of product currently flowing through the pipeline, tracking of slugs of product as they pass through the pipeline 1400, inter-relationships between pumps of the pipeline 1400 or between different stations of the pipeline 1400 (e.g., increasing the pressurization of a first pump may affect the pressurization capabilities of a different pump, etc.), etc. In some embodiments the constraints are limits (e.g., upper and lower limits) of any of the decision or control variables x. In some embodiments, the constraints are inter-relationships between different of the control or decision variable x. For example, adjusting one of the control decisions may affect a limit of another of the control decisions. In some embodiments, the constraints include a minimal amount of product delivered to the customer (e.g., find optimal control decisions that minimize energy consumption but still deliver a particular amount of product to the customer).

In some embodiments, the energy objective function also includes one or more models for tracking slugs of different types of product through the pipeline 1400. For example, since different products may result in different constraints on pressurization of the pumps or may result in different constraints on an amount of DRA that can be provided to the slug of product, the objective function generated by the objective function generator 1518 can account for and selectively adjust or control the constraints based on the location of the different slugs in the pipeline 1400. The slugs may be tracked through the pipeline 1400 based on a mathematical model that predicts transmission of the slugs of the various products through the pipeline 1400 as a function of different control decisions of the pumps (e.g., increasing the pressure may increase a rate that the slug travels through the pipeline 1400). In some embodiments, the location of the slugs is obtained in real-time based on sensor data obtained from the pipeline 1400 (e.g., chemical sensors that detect different types of product being shipped through the pipeline 1400). In some embodiments, the processing circuitry 1504 or the system 1500 is configured to use any of the sensors, pipe structure, or techniques of the controller 102 as described in greater detail above with reference to FIGS. 1-11 to identify and track slugs of product through the pipeline 1400.

In some embodiments, the energy objective function also accounts for power generated by any of the power generation 1442-1446. For example, the objective function generator 1518 can include terms or models that predict power generation of the power generation equipment 1442-1446 as a function of predicted weather conditions. For example, if the power generation equipment 1442-1446 includes solar panels, the weather conditions may indicate sunshine, cloudiness, etc., or an expected amount of solar radiance that will be experienced by the solar panels and that can be used to predict an amount of energy generation of the solar panels. Similarly, if the power generation equipment 1442-1446 includes wind turbines, the weather conditions may indicate average windiness that can be used to predict an amount of energy generation of the wind turbines over a future time period. In some embodiments, the energy objective function also accounts for losses associated with charging or discharging the power storage 1436.

In some embodiments, optimization of the energy objective function as generated or defined by the energy objective function generator 1522 results in determining an optimal or minimal emissions solution. For example, minimization of the energy consumption of the energy objective function generator 1522 may result in minimal use of the equipment, and thereby minimal emissions (e.g., carbon dioxide, greenhouse gases, etc.) being released to the environment or the atmosphere. In some embodiments, the energy optimization mode is also referred to as an emissions optimization mode to minimize amount of emissions.

In some embodiments, the objective function generator 1518 is configured to use the system information to construct the objective functions, and to use the real-time sensor data to populate one or more terms or variables of the objective function. For example, the real-time sensor data can be used to inform the objective function generator 1518 regarding current conditions of the pipeline 1400, current operational status of equipment of the pipeline 1400, weather conditions at different locations along the pipeline 1400, etc.

Referring still to FIG. 15, the objective function generator 1518 includes the cost objective function generator 1520, according to some embodiments. In some embodiments, the cost objective function generator 1520 is configured to generate a cost objective function that predicts monetary cost of the pipeline 1400 or of a single station of the pipeline 1400 as a function of one or more control decisions (e.g., operation of pumps 1406-1418) subject to one or more control decisions. In some embodiments, the cost objective function is similar to the energy objective function but also accounts for costs associated with purchasing energy (e.g., costs associated with purchasing electrical energy, natural gas, etc.) at different times of day, storage of electrical energy for later use (e.g., charging the power storage 1436-1440 with electrical energy and using the stored electrical energy at a time of day when energy costs are more expensive), power generation, carbon tax costs, etc.

In some embodiments, the cost objective function has the form:

$$J(x)=E(x)(\text{Cost}(k))$$

or:

$$J(x) = \left(\sum_{k=1}^{m} (\text{Component or Station Energy Costs})_k\right)(\text{Cost}(k))$$

where Cost(k) is a cost per unit of energy for the kth timestep. In some embodiments, the Cost(k) includes a cost of unit of energy that is purchased based on time of day. For example, the utility provider 1510 can provide a schedule of energy costs (e.g., electrical energy costs) that vary throughout the day based on demand. In some embodiments, energy may be less expensive at night, and so optimization or minimization of the cost objective function may determine that it is optimal, from a cost perspective, to operate the pipeline 1400 at a higher rate at night to leverage cheaper prices of energy at various times of day. In some embodiments, the Cost(k) includes cost of energy that can be produced (e.g., for free), stored, and used later. In some embodiments, the Cost(k) includes cost of energy that can be purchased at a time when energy is less expensive (e.g., during the night time) and used at a later time when costs of purchasing energy are higher. In this way, optimization of the cost objective function as generated by the cost objective function generator 1520 may determine optimal control decisions for the purchase, use, storage, generation, and discharge of energy over a future time horizon. In some embodiments, the processing circuitry 1504 is configured to use machine learning to adjust or tune when to charge, discharge, or store energy in the power storage 1436-1440 of the stations 1404-1408.

In some embodiments, the cost objective function is also minimized by the optimizer 1526 subject to one or more constraints. The constraints for optimizing or minimizing the cost objective function can be the same as or similar to the constraints for optimizing or minimizing the energy objective function as described in greater detail above. In this way, the controller 1502 can determine optimal control decisions for the pipeline 1400 or for a single station of the pipeline 1400 in terms of monetary cost for a future time horizon (e.g., a day, a week, several days, etc.).

Referring still to FIG. 15, the objective function generator 1518 includes the delivery objective function generator 1524, according to some embodiments. In some embodiments, the delivery objective function generator 1524 is configured to generate an objective function that defines or predicts a delivered amount of product over a future time horizon. For example, the delivered amount of product can be defined as a flowrate of the pipeline 1400 at a customer end of the pipeline 1400, or a quantity of product (e.g., in gallons, liters, weight, etc.) of the product shipped to the customer over a time period. In some embodiments, the delivery objective function defines delivered amount of product in terms of the control or decision variables x. In some embodiments, the delivery objective function is provided to the optimizer 1526 and maximized to determine control or decision variables that result in maximum product delivery. In this way, the pumps 1406-1418 can be operated to deliver as much product as possible to the customer, regardless of the energy consumption, emissions, or costs associated with doing so.

The optimizer 1526 is configured to obtain any of the objective functions described herein from the objective function generator 1518 and optimize (e.g., maximize or minimize) the objective functions to determine control or decision variables that result in the desired behavior of the pipeline 1400. In some embodiments, the control or decision variables include determinations of how much DRA, diluent, or other additive to add, where and when to add the DRA, which of the pumps 1406-1418 to operate, how to operate the pumps 1406-1418, etc., to achieve minimal emissions and/or minimal energy use, minimal monetary costs, or maximize product delivery of the pipeline 1400 over a time period.

The optimizer 1526 is configured to provide detailed optimization results to the user input manager 1530 for display on the user interface 1532 (e.g., so that the user can view how the pipeline 1400 is to be operated to achieve the desired goal), and is also configured to provide control decisions to the pipeline 1400 or equipment thereof to operate the pipeline 1400 according to the control or decision variables. In some embodiments, the pipeline 1400 uses the control decisions that are determined by performing the optimization to operate over the time period.

In some embodiments, the optimizations described herein are performed for different batches of product. For example, any of the optimizations described herein can be performed for a first batch of a diesel product, a subsequent batch of a gasoline product, a subsequent batch of jet fuel product, etc. The optimization modes can be provided and used as determined by a user (e.g., an operator of the pipeline). In some embodiments, the operator may use customer requirements (e.g., requirements of different optimization modes) for various segments of the pipeline 1400 (e.g., from one pump station to the next) or across the entire pipeline 1400. For example if a customer requires product delivery as soon as possible, the optimization mode can be performed to maximize product delivery. If another customer requires product delivery in a minimal cost manner the optimization can be performed to deliver a desired amount of the product to the customer according to a cost-effective solution (e.g., performing the optimization using the cost objective function as generated by the cost objective function generator 1520).

In some embodiments, the optimization is performed individually for each of the stations 1404-1408. For example, the optimization can be performed on a station-by-station basis to pump the product sufficiently to the next station (e.g., accounting for elevation changes) in a most cost-effective manner, in a most energy efficient manner, or in a maximum delivery rate manner. Advantageously, implementing the functionality of the controller 1502 at each of the stations 1404-1408 facilitates autonomous optimization that is also at least partially sensor based, so that if a communications outage occurs, the pipeline 1400 can still operate optimally. For example, if the third station 1408 loses power or experiences an outage, optimization decisions at the second station 1406 may change to account for the inoperability of the third station 1408, without resulting in inoperability of the entire pipeline 1400. Further, the optimization techniques described herein are mathematically based as opposed to a subject matter expert (SME) approach.

Discrete Optimizations

Figure 16:
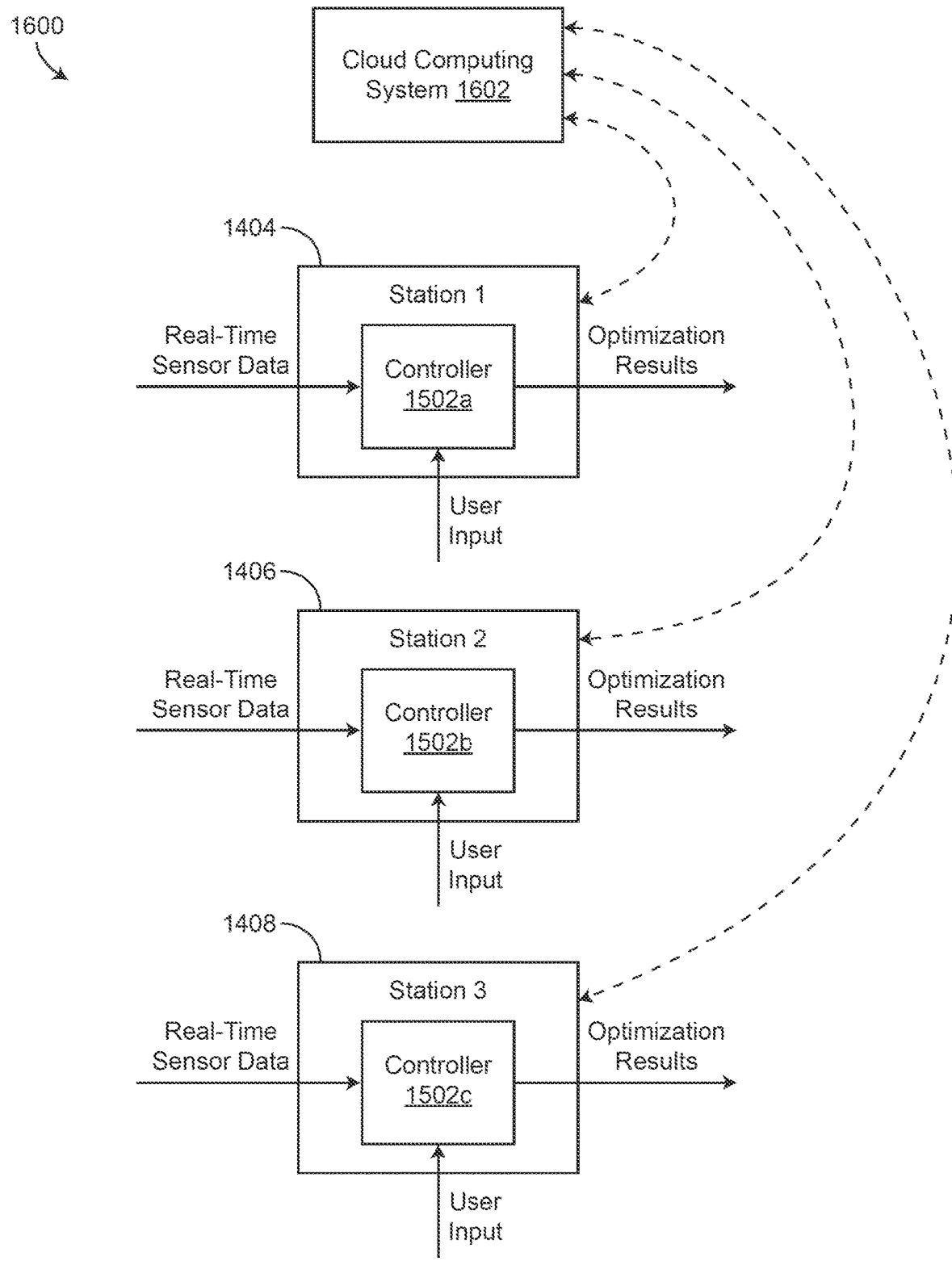
FIG. 16 is a block diagram of a cloud computing system in communication with controllers at different stations of a pipeline system, each of the controllers configured to perform an independent optimization, according to some embodiments.

Referring particularly to FIG. 16, a block diagram 1600 of a discrete optimization system for each of the stations 1404-1408 is shown, according to some embodiments. In some embodiments, each of the stations 1404-1408 includes a corresponding controller 1502a-1502c. In some embodiments, the first station 1404 is configured to use the controller 1502a to perform an optimization for itself using real-time sensor data and/or a user input indicating a desired optimization mode. Similarly, the second station 1406 and the third station 1408 can use corresponding controllers 1502b and 1502c to perform optimizations for themselves based on real-time sensor data and user inputs indicating desired optimization modes. In this way, the optimizations can be performed locally at each of the stations 1404-1408 to determine optimization results and/or control decisions for the equipment of the stations 1404-1408. In some embodiments, the optimizations are performed autonomously at each of the stations 1404-1408 to facilitate autonomous optimal operation of each of the stations 1404-1408.

In some embodiments, a cloud computing system 1602 is configured to obtain data from any of the stations 1404-1408 or from the pipeline 1400 to perform an overall optimization for the pipeline 1400 in a coordinated manner. In some embodiments, the cloud computing system 1602 is configured to use any of the functionality of the controller 1502 to perform an overall optimization of the pipeline 1400. In this way, the optimization techniques as described in greater detail above with reference to FIG. 15 can be implemented locally at each station 1404-1408 to optimize operation of each station 1404-1408 or can be implemented on cloud computing system 1602 globally for the entire pipeline 1400 to determine an optimal operation of the pipeline 1400. In some embodiments, an overall optimization of the pipeline 1400 is performed in a distributed manner among the controllers 1502a-1502c of the stations 1404-1408, with the controllers 1502a-1502c in communication with each other. In some embodiments, an overall optimization is performed (either at cloud computing system 1602 or distributed among the controllers 1502a-1502c) and if communications disruptions are detected, the controllers 1502a-1502c default to performing individual optimizations for each station 1404-1408.

Processes

Figure 17:
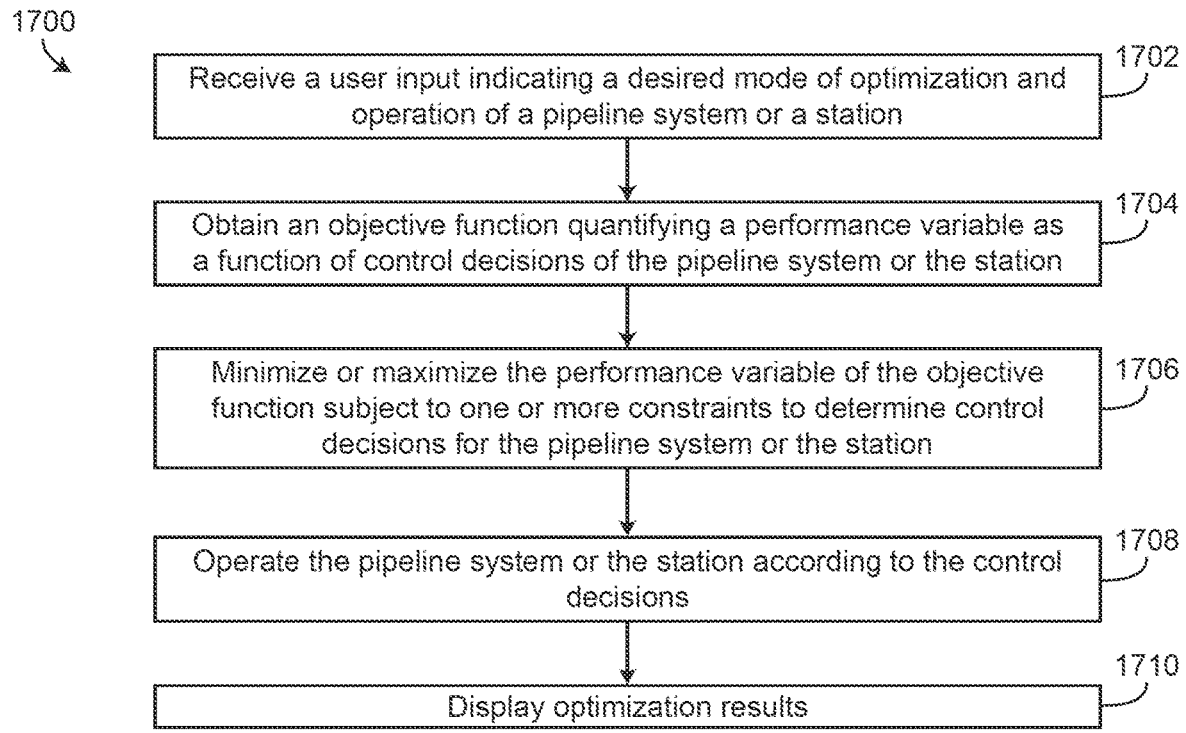
FIG. 17 is a flow diagram of a process for selecting between different optimization schemes for a pipeline system, according to some embodiments.

Referring particularly to FIG. 17, a process 1700 for optimizing operation of a pipeline is shown, according to some embodiments. Process 1700 includes steps 1702-1710 and can be performed by the controller 1502, the controllers 1502a-1502c, or the cloud computing system 1602 as described in greater detail above with reference to FIGS. 14-16.

Process 1700 includes receiving a user input indicating a desired mode of optimization and operation of a pipeline system or station (step 1702), according to some embodiments. In some embodiments, step 1702 includes receiving an input indicating whether the process 1700 should be performed to optimize and operate according to costs of the pipeline system or station, optimize and operate according to energy consumption of the pipeline system or station, or to optimize and operate according to delivery rate or quantity of the pipeline system or station. In some embodiments, the desired mode of optimization and operation of the pipeline system or station is automatically determined based on user inputs.

Process 1700 includes obtaining an objective function that quantifies a performance variable as a function of control decisions of the pipeline system or the station (step 1704), according to some embodiments. In some embodiments, the objective function predicts the performance variable as a function of the control decisions of the pipeline system or the station over a future time period. In some embodiments, the performance variable is any of delivery rate or throughput, energy consumption or emissions, or cost of operation of the pipeline system or the station. In some embodiments, step 1704 is performed by the objective function generator 1518 of the controller 1502, or more particularly, by the various modules of the objective function generator 1518.

Process 1700 includes minimizing or maximizing the performance variable of the objective function subject to one or more constraints to determine control decisions for the pipeline system or the station (step 1706), according to some embodiments. In some embodiments, step 1706 includes minimizing or maximizing the performance variable by varying or adjusting values of the control decisions over a future time period. In some embodiments, step 1706 is performed by the optimizer 1526. In some embodiments, the constraints include limits on different control decisions, internal parameters, parameters of the pumps (e.g., max operational flow rate, etc.), etc. In some embodiments, step 1706 is performed to determine control decisions that result in minimum or maximum of the performance variable over the future time period.

Process 1700 includes operating the pipeline system or the station according to the control decisions (step 1708), according to some embodiments. In some embodiments, step 1708 includes adjusting various control parameters of different equipment of the pipeline system or the station according to the control decisions. In some embodiments, step 1708 includes providing the control decisions to different equipment of the pipeline system or the station. In some embodiments, step 1708 includes operating the equipment of the pipeline system or the station over the future time period according to the control decisions. The control decisions can be a schedule of different pump setpoints, operational parameters, how much DRA to inject, when and where to inject the DRA, etc. Step 1708 can be performed by the pipeline 1400, according to some embodiments.

Process 1700 includes displaying optimization results (step 1710), according to some embodiments. In some embodiments, step 1710 includes operating the user interface 1532 to provide display data of the optimization results. In some embodiments, the optimization results include displays of different parameters, the control decisions, etc., forecasted over a future time horizon. In some embodiments, step 1710 is performed by the user interface 1532.

Figure 18:
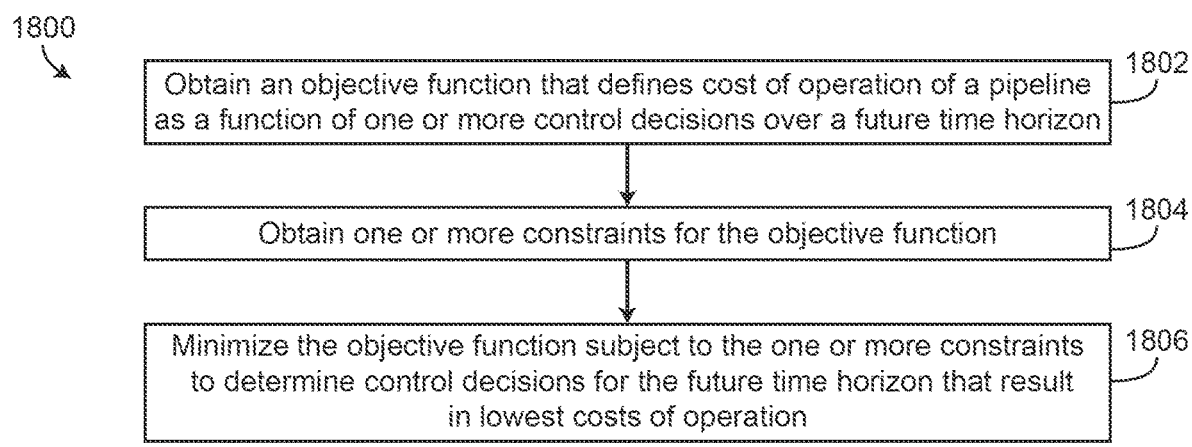
FIG. 18 is a flow diagram of a process for optimizing a pipeline system to minimize operation costs, according to some embodiments.

Referring particularly to FIG. 18, a process 1800 for performing an optimization in terms of cost of operation of a pipeline is shown, according to some embodiments. Process 1800 includes steps 1802-1806 and can be performed by the objective function generator 1518 and the optimizer 1526 as described in greater detail above with reference to FIG. 15. In some embodiments, process 1800 is performed to determine how to operate the pipeline system or a booster station in a most cost-effective manner. In some embodiments, process 1800 is performed as steps 1704-1706 of process 1700.

Process 1800 includes obtaining an objective function that defines cost of operation of a pipeline as a function of one or more control decisions over a future time horizon (step 1802), according to some embodiments. In some embodiments, step 1802 includes defining an objective function that expresses cost of operation of the pipeline system summed over a future time horizon. The cost of operation can include energy costs associated with purchasing energy (e.g., purchasing electricity from a utility provider), cost savings that can be achieved based on available energy generation and/or weather conditions, costs associated with purchasing and storing and using energy at different times of day, adjustment of operating parameters throughout the day (e.g., run harder at night when electricity is cheaper), etc. In some embodiments, the cost of operation is a monetary cost that is determined based on amount of energy purchased over the future time horizon and a price of energy over the future time horizon. In some embodiments, step 1802 is performed by the cost objective function generator 1520.

Process 1800 includes obtaining one or more constraints for the objective function (step 1804), according to some embodiments. In some embodiments, step 1804 includes defining, generating or otherwise obtaining the one or more constraints for the objective function. In some embodiments, the constraints include limits on operability of the various equipment of the pipeline, limits on how much DRA can be provided to different types of product being shipped through the pipeline, etc. In some embodiments, the constraints are additional equations or conditions that must be met in order for the solution to be viable or realistically achievable. In some embodiments, step 1804 is performed by the objective function generator 1518 or the optimizer 1526.

Process 1800 includes minimizing the objective function subject to the one or more constraints to determine control decisions for the future time horizon that result in lowest costs of operation (step 1806), according to some embodiments. In some embodiments, step 1806 includes performing a multi-variable optimization to determine control decisions that satisfy the one or more constraints and that result in a lowest or optimal cost of operation. In some embodiments, step 1806 is performed by the optimizer 1526 based on the objective function obtained in step 1804.

Figure 19:
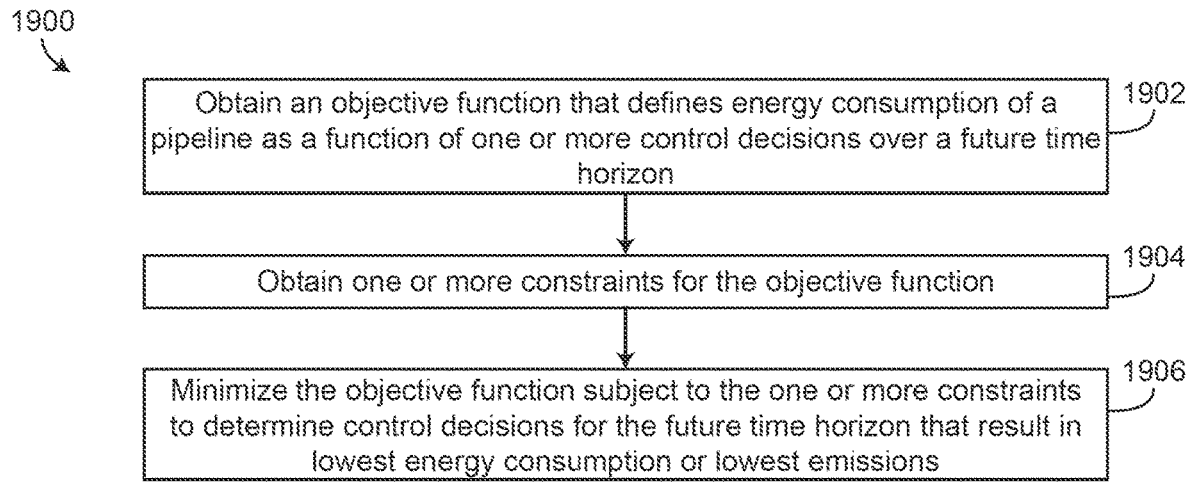
FIG. 19 is a flow diagram of a process for optimizing a pipeline system to minimize emissions or energy usage of the pipeline system, according to some embodiments.

Referring particularly to FIG. 19, a process 1900 for performing an optimization in terms of energy consumption or emissions of a pipeline is shown, according to some embodiments. Process 1900 includes steps 1902-1906 and can be performed by the objective function generator 1518 and the optimizer 1526 as described in greater detail above with reference to FIG. 15. In some embodiments, process 1900 is performed to determine how to operate the pipeline system 1400 or a booster station in a most energy efficient or emissions efficient manner. In some embodiments, process 1900 is performed as steps 1704-1706 of process 1700.

Process 1900 includes obtaining an objective function that defines energy consumption of a pipeline as a function of one or more control decisions over a future time horizon (step 1902), according to some embodiments. In some embodiments, step 1902 includes defining an objective function that expresses energy consumption or emissions of the pipeline system summed over a future time horizon. The energy consumption can include energy consumption of various pumps, equipment, DRA injectors, energy losses associated with charging energy storage devices, etc., as a function of one or more of the control decisions. In some embodiments, the control decisions are adjustments to various controllable equipment of the pipeline that affects the energy consumption or emissions produced by the pipeline.

Process 1900 includes obtaining one or more constraints for the objective function (step 1904), according to some embodiments. In some embodiments, step 1904 is the same as or similar to step 1804 of process 1800. In some embodiments, step 1904 includes defining one or more constraints that limit various parameters (e.g., control decisions, the performance variable, operational parameters of the pipeline, etc.). In some embodiments, step 1904 is performed by the objective function generator 1518 or the optimizer 1526.

Process 1900 includes minimizing the objective function subject to the one or more constraints to determine control decisions for the future time horizon that result in a lowest energy consumption or lowest emissions (step 1906), according to some embodiments. In some embodiments, step 1906 is the same as or similar to step 1806 of process 1800.

Figure 20:
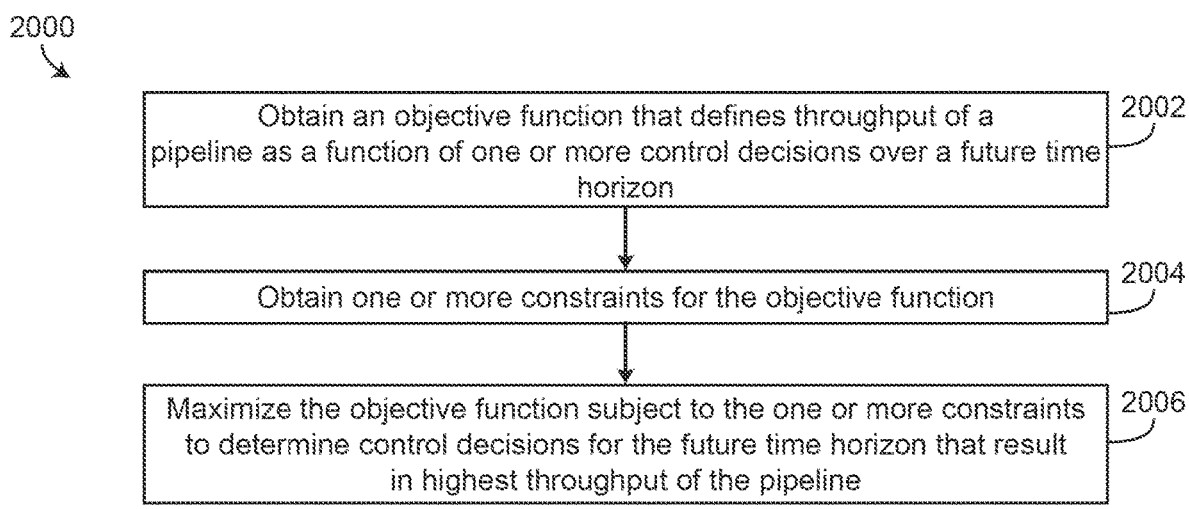
FIG. 20 is a flow diagram of a process for optimizing a pipeline system to maximize throughput of the pipeline system, according to some embodiments.

Referring particularly to FIG. 20, a process 2000 for performing an optimization in terms of throughput or product delivery is shown, according to some embodiments. Process 2000 includes steps 2002-2006 and can be performed by the objective function generator 1518 and the optimizer 1526 as described in greater detail above with reference to FIG. 15. In some embodiments, process 2000 is performed to determine how to operate the pipeline (e.g., pipeline system 1400) to provide as much product through the pipeline as possible, regardless of the energy consumption or cost associated with such operation. In some embodiments, the throughput is defined in terms of volume, rate, etc., of the product through the pipeline.

Process 2000 includes obtaining an objective function that defines throughput of a pipeline as a function of one or more control decisions over a future time horizon (step 2002), according to some embodiments. In some embodiments, step 2002 includes defining an objective function that quantitatively predicts quantity of delivered product or flow rate of delivered product as a function of one or more control decisions. In some embodiments, step 2002 is the same as or similar to step 1902 or step 1802 of process 1900 or 1800, respectively.

Process 2000 includes obtaining one or more constraints for the objective function (step 2004), according to some embodiments. In some embodiments, step 2004 is the same as or similar to step 1904 of process 1900 or the same as or similar to step 1804 of process 1800. Process 2000 also includes maximizing the objective function subject to the one or more constraints to determine control decisions for the future time horizon that result in highest throughput of the pipeline (step 2006), according to some embodiments. In some embodiments, step 2006 is performed to maximize the throughput or product delivery of the pipeline, regardless of energy consumption or costs associated with such operation. Process 2000 can be performed as steps 1704-1706 of process 1700.

Crude Oil Pipeline Optimization

Referring again to FIGS. 14-15, the pipeline 1400 may be a crude oil pipeline and the controller 1502 can be configured to perform its functionality for the crude oil pipeline, according to some embodiments. In some embodiments, the crude oil pipeline is operated similarly to the pipeline 1400 but instead of DRA, a dilutant (e.g., to dilute or adjust a viscosity of the crude oil) is provided. The controller 1502 can perform its functionality to determine how much dilutant to add, when to add the dilutant, and where to add the dilutant. In some embodiments, the controller 1502 is also configured to obtain temperature values of the pipeline 1400 and use the temperature values to determine viscosity of the crude oil and how much dilutant to add to the pipeline to achieve a desired viscosity. In some embodiments, the objective functions or the constraints include a relationship between viscosity of the crude oil in the pipeline and energy required to pump the crude oil at the current viscosity. In this way, the viscosity of the crude oil may be adjusted to improve efficiency of operation of the crude oil pipeline for shipping or transporting the crude oil.

Gas Pipeline Optimization

Referring again to FIGS. 14-15, the pipeline 1400 may be a gas pipeline (e.g., a pipeline for a natural gas or an acid gas) and the controller 1502 can be configured to perform its functionality for the gas pipeline, according to some embodiments. In some embodiments, the gas pipeline is operated similarly to the pipeline 1400 but additives are typically not provided to the pipeline 1400. The controller 1502 can perform its functionality to determine how to operate the pumps of the stations 1404 to optimize power, emissions, cost, throughput, etc., according to the mode of optimization. In some embodiments, the controller 1502 is configured to optimize variables such as which compressors or pumps of the pipeline 1400 are operated, speeds of the pumps or compressors of the pipeline 1400, whether to operate coolers downstream of the compressors or pumps, and what level of cooling is provided.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A method for optimizing a pipeline comprising:
    determining a mode of optimization and operation for the pipeline from a plurality of modes of optimization and operation;
    obtaining an objective function quantifying a performance variable as a function of one or more control decisions of the pipeline over a future time horizon;
    optimizing the objective function subject to one or more constraints to determine control decisions for a plurality of pump stations of the pipeline at a plurality of geographical locations along the pipeline that result in an optimal value of the performance variable, wherein optimizing the objective function comprises using a model that predicts a movement of slugs of product through the pipeline to determine the control decisions comprising both (1) setpoints for pumps or compressors of each of the plurality of pump stations, and (2) an amount of a drag reducing agent (DRA) to add to the pipeline upstream or downstream of each of the plurality of pump stations for a type of the product such that the performance variable results in the optimal value; and
    operating the pumps or the compressors and injectors of the pipeline to deliver the product through the pipeline according to the control decisions;
    wherein the plurality of modes of optimization and operation comprise a throughput mode of optimization and operation in which the performance variable of the objective function is a delivered amount of product and the objective function is a delivery objective function, where optimizing the delivery objective function results in a determination of the control decisions that result in a maximum value of delivered amount of product over the future time horizon,
    wherein the plurality of modes of optimization and operation further comprises at least one of:
    an emissions or energy consumption mode, in which the performance variable of the objective function is energy consumption and the objective function comprises an energy objective function, wherein optimizing the objective function comprises minimizing the objective function to determine the control decisions that result in a minimum value of the performance variable over the future time horizon; and
    a monetary cost mode, in which the performance variable of the objective function is monetary cost and the objective function comprises a cost objective function, wherein optimizing the objective function comprises minimizing the objective function to determine the control decisions that result in a minimum value of the monetary cost over the future time horizon, and
    wherein the control decisions in the throughput mode are different from the control decisions in the emissions or energy consumption mode or the monetary cost mode.

2. The method of claim 1, wherein the method is performed for an entirety of the pipeline to determine the control decisions for the entirety of the pipeline.

3. The method of claim 1, wherein the method is performed for a station of the pipeline to determine the control decisions for the station of the pipeline.

4. The method of claim 1, wherein the objective function comprises a model of a station of the pipeline, wherein the station of the pipeline comprises a plurality of pumps arranged in series or parallel configured to pump a product through the pipeline, wherein the model of the station predicts one or more operational parameters of the station as a function of the control decisions.

5. The method of claim 1, wherein the control decisions are for each timestep of the future time horizon, wherein the control decisions further comprise an amount of energy to purchase from a utility provider to operate the pipeline.

6. The method of claim 1, wherein the pipeline is configured to ship any of a liquid product, a gas product, or a product including a mixture of liquid and gas.

7. A pipeline comprising:
    a plurality of pipeline stations, each pipeline station comprising at least one pump or compressor;
    a pipe connecting the plurality of pipeline stations; and
    a controller configured to operate in a plurality of modes of optimization and operation, the controller configured to:
    determine a mode of optimization and operation for the pipeline from the plurality of modes of optimization and operation;
    obtain an objective function quantifying a performance variable as a function of one or more control decisions of the pipeline over a future time horizon;
    optimize the objective function subject to one or more constraints to determine control decisions for the plurality of pipeline stations of the pipeline at a plurality of geographical locations along the pipeline that result in an optimal value of the performance variable, wherein optimizing the objective function comprises using a model that predicts a movement of slugs of product through the pipeline to determine the control decisions comprising both (1) setpoints for pumps or compressors of each of the plurality of pipeline stations, and (2) an amount of a drag reducing agent (DRA) to add to the pipeline upstream or downstream of each of the plurality of pipeline stations for a type of the product such that the performance variable results in the optimal value; and operate the pump or compressor and injectors of the pipeline to deliver the product through the pipeline according to the control decisions;

wherein the plurality of modes of optimization and operation comprise a throughput mode of optimization and operation in which the performance variable of the objective function is a delivered amount of product and the objective function is a delivery objective function, wherein optimizing the delivery objective function results in a determination of the control decisions that result in a maximum value of delivered amount of product over the future time horizon, wherein the plurality of modes of optimization and operation further comprises at least one of:

an emissions or energy consumption mode, in which the performance variable of the objective function is energy consumption and the objective function comprises an energy objective function, wherein optimizing the objective function comprises minimizing the objective function to determine the control decisions that result in a minimum value of the performance variable over the future time horizon; and a monetary cost mode, in which the performance variable of the objective function is monetary cost and the objective function comprises a cost objective function, wherein optimizing the objective function comprises minimizing the objective function to determine the control decisions that result in a minimum value of the monetary cost over the future time horizon, and wherein the control decisions in the throughput mode are different from the control decisions in the emissions or energy consumption mode or the monetary cost mode.

8. The pipeline of claim 7, wherein the controller is configured to optimize the objective function for an entirety of the pipeline to determine the control decisions for the entirety of the pipeline.

9. The pipeline of claim 7, wherein the controller is configured to optimize the objective function for one of the plurality of pipeline stations of the pipeline to determine the control decisions for the one of the plurality of pipeline stations of the pipeline.

10. The pipeline of claim 7, wherein the objective function comprises a model of at least one of the plurality of pipeline stations of the pipeline, wherein the at least one pipeline station of the pipeline comprises a plurality of the pumps arranged in series or parallel configured to pump a product through the pipeline, wherein the model of the pipeline station predicts one or more operational parameters of the station as a function of the control decisions.

11. The pipeline of claim 7, wherein the control decisions are for each timestep of the future time horizon, wherein the control decisions further comprise an amount of energy to purchase from a utility provider to operate the pipeline.

12. The pipeline of claim 7, wherein the pipeline is configured to ship any of a liquid product, a gas product, or a product including a mixture of liquid and gas.

13. The pipeline of claim 7, wherein the control decisions comprise an amount and type of additive to add to a product of the pipeline.

14. A controller for optimizing a pipeline, the controller configured to:

determine a mode of optimization and operation for the pipeline from a plurality of modes of optimization and operation;

obtain an objective function quantifying a performance variable as a function of one or more control decisions for a plurality of pump stations of the pipeline at a plurality of geographical locations along the pipeline that result in an optimal value of the performance variable over a future time horizon, wherein optimizing the objective function comprises using a model that predicts movement of slugs of product through the pipeline to determine control decisions comprising both (1) setpoints for pumps or compressors of each of the plurality of pump stations, and (2) an amount of a drag reducing agent (DRA) to add to the pipeline upstream or downstream of each of the plurality of pump stations for a type of the product such that the performance variable results in the optimal value;

optimize the objective function subject to one or more constraints to determine the control decisions for the pipeline that result in the optimal value of the performance variable; and operate the pumps or the compressors and injectors of the pipeline to deliver the product through the pipeline according to the control decisions;

wherein the plurality of modes of optimization and operation comprise a throughput mode of optimization and operation in which the performance variable of the objective function is a delivered amount of product and the objective function comprises a delivery objective function, wherein optimizing the objective function results in a determination of the control decisions that result in a maximum value of delivered amount of product over the future time horizon, wherein the plurality of modes of optimization and operation further comprises at least one of:

an emissions or energy consumption mode, in which the performance variable of the objective function is energy consumption and the objective function comprises an energy objective function, wherein optimizing the objective function comprises minimizing the objective function to determine the control decisions that result in a minimum value of the performance variable over the future time horizon; and a monetary cost mode, in which the performance variable of the objective function is monetary cost and the objective function comprises a cost objective function, wherein optimizing the objective function comprises minimizing the objective function to determine the control decisions that result in a minimum value of the monetary cost over the future time horizon, and wherein the control decisions in the throughput mode are different from the control decisions in the emissions or energy consumption mode or the monetary cost mode.

15. The controller of claim 14, wherein the objective function comprises a model of a station of the pipeline, wherein the station of the pipeline comprises a plurality of pumps arranged in series or parallel configured to pump a product through the pipeline, wherein the model of the station predicts one or more operational parameters of the station as a function of the control decisions.

16. The controller of claim 14, wherein the control decisions are for each timestep of the future time horizon, wherein the control decisions further comprise an amount of energy to purchase from a utility provider to operate the pipeline.

* * * * *